US008860717B1

(12) United States Patent
Zeiger et al.

(10) Patent No.: US 8,860,717 B1

(45) Date of Patent: Oct. 14, 2014

(54) WEB BROWSER FOR VIEWING A THREE-DIMENSIONAL OBJECT RESPONSIVE TO A SEARCH QUERY

(75) Inventors: Roni F. Zeiger, Mountain View, CA (US); Arthur E. Blume, Melrose, MA (US); David Kogan, Natick, MA (US); Rachel L. Petterson, Redwood City, CA (US); Won S. Chun, Manhasset, NY (US); Evangelos Kokkevis, Mountain View, CA (US)

(73) Assignee: Google Inc., Mountain View, CA (US)

( * ) Notice: Subject to any disclaimer, the term of this patent is extended or adjusted under 35 U.S.C. 154(b) by 79 days.

(21) Appl. No.: 13/433,237

(22) Filed: Mar. 28, 2012

Related U.S. Application Data

(60) Provisional application No. 61/469,038, filed on Mar. 29, 2011.

(51) Int. Cl.
*G06T 15/00* (2011.01)

(52) U.S. Cl.
USPC ............................ 345/419; 345/420; 345/427

(58) Field of Classification Search
None
See application file for complete search history.

(56) References Cited

U.S. PATENT DOCUMENTS

| | | | | |
|---|---|---|---|---|
| 5,526,478 | A | 6/1996 | Russell, Jr. et al. | |
| 6,169,545 | B1 * | 1/2001 | Gallery et al. | 715/748 |
| 7,262,783 | B2 | 8/2007 | Kramer et al. | |
| 7,474,317 | B2 | 1/2009 | Dolph et al. | |
| 7,484,183 | B2 | 1/2009 | Look et al. | |
| 7,557,804 | B1 | 7/2009 | McDaniel | |
| 7,636,096 | B2 | 12/2009 | Mikulecky | |
| 7,697,013 | B2 | 4/2010 | Dolph et al. | |
| 7,697,014 | B2 | 4/2010 | Dolph et al. | |
| 8,416,240 | B1 | 4/2013 | Kuffner, Jr. et al. | |
| 8,456,467 | B1 | 6/2013 | Hickman et al. | |
| 2002/0011990 | A1 | 1/2002 | Anwar | |
| 2003/0193496 | A1 | 10/2003 | Wada | |
| 2004/0263512 | A1 | 12/2004 | Santodomingo et al. | |
| 2006/0055711 | A1 | 3/2006 | Hayakawa | |
| 2008/0016472 | A1 | 1/2008 | Rohlf et al. | |
| 2008/0225007 | A1 | 9/2008 | Nakadaira et al. | |
| 2008/0247636 | A1 * | 10/2008 | Davis et al. | 382/152 |
| 2009/0027418 | A1 | 1/2009 | Maru et al. | |
| 2009/0132943 | A1 | 5/2009 | Minsky et al. | |
| 2010/0185976 | A1 | 7/2010 | Sadanandan | |
| 2011/0161875 | A1 | 6/2011 | Kankainen | |
| 2011/0254861 | A1 | 10/2011 | Emura et al. | |
| 2011/0273473 | A1 | 11/2011 | Kim | |
| 2011/0273575 | A1 | 11/2011 | Lee | |

(Continued)

OTHER PUBLICATIONS

Gering, D., A System for Surgical Planning and Guidance using Image Fusion and Interventional MR, Dec. 1999, Masters thesis, Massachusetts Institute of Technology, pp. 1-106.*

(Continued)

*Primary Examiner* — Said Broome
(74) *Attorney, Agent, or Firm* — McDonnell Boehnen Hulbert & Berghoff LLP

(57) ABSTRACT

Computer-implemented methods for viewing a three-dimensional (3D) object using a web browser having integrated 3D modeling capabilities are provided. In one aspect, a method includes obtaining data of a 3D object via a web browser having integrated 3D modeling capabilities, and displaying, in the web browser, at least a portion of the 3D object based on an initial default view, or a user selected view based on a query received from a user. Systems and machine-readable media are also provided.

17 Claims, 12 Drawing Sheets

420
412b
404
410
414b
422
416
searchableandviewableobject
liver
labels on

(56) References Cited

U.S. PATENT DOCUMENTS

| | | | |
|---|---|---|---|
| 2011/0307801 | A1 | 12/2011 | Sherman |
| 2012/0099000 | A1 | 4/2012 | Kim |
| 2012/0194547 | A1 | 8/2012 | Johnson et al. |

OTHER PUBLICATIONS

Shout3D 2.5 Demo Tour, Feb. 2005,http://shout3d.net/shout3d_2.5_doc_dir/Shout3d_runtime/demos/demo_tour/1.html, pp. 1-11.*

Visible Body—3D Human Anatomy, Mar. 28, 2012, retrieved from <http://www.visiblebody.com>.

Chittaro et al.,"The Interactive 3D BreakAway Map: A navigation and examination aid for multi-floor 3D worlds", 2005.

ContMedia Shop,"ContMedla Human 3D Advanced Internet Edition" Available at: http://www.contmediausa.com/Shop/App/ Products/Details.aspx?pid=1. Visited on: Mar. 29, 2011, 2011.

Russell et al., "LabelMe: a database and web-based tool for image annotation", International Journal of Computer VIsion, 77.1, pp. 157-173, 2008.

Sons et al.,"XML3D: Interactive 3D Graphics for the Web", Proceedings of the 15th International Conference on Web 3D Technology, ACM, 2010.

Zhang et al.,"Dynamic Labeling Management in Virtual and Augmented Environments", Dec. 2005.

Preim, Berhard et al., "Coherent zooming of illustrations with 3D-grahics and text", Graphics Interface, vol. 97, 1997.

* cited by examiner

WEB BROWSER FOR VIEWING A THREE-DIMENSIONAL OBJECT RESPONSIVE TO A SEARCH QUERY

CROSS-REFERENCE TO RELATED APPLICATIONS

The present application claims the benefit of priority under 35 U.S.C. §119 from U.S. Provisional Patent Application Ser. No. 61/469,038 entitled "Searchable 3D Object Viewer," filed on Mar. 29, 2011, the disclosure of which is hereby incorporated by reference in its entirety for all purposes.

BACKGROUND

1. Field

The present disclosure generally relates to the visualization of three-dimensional objects using a computer.

2. Description of the Related Art

Current three-dimensional (3D) rendering systems display 3D objects in a 3D space and allow the objects to be viewed from viewpoints surrounding the 3D object. However, these conventional systems typically require the installation of specialized software in order to permit the 3D object to be displayed in the 3D space. Furthermore, if the 3D object has many distinct features and/or layers, it may be very difficult to locate the distinct features or visualize the distinct layers, let alone locate distinct features on each distinct layer of the 3D object.

SUMMARY

According to one embodiment of the present disclosure, a computer-implemented method for viewing a three-dimensional (3D) object using a web browser having integrated 3D modeling capabilities is provided. The method includes obtaining data of a 3D object via a web browser having integrated 3D modeling capabilities, and displaying, in the web browser, at least a portion of the 3D object based on an initial default view, or a user selected view based on a query received from a user.

In certain embodiments of the method, the query is an input from a pointing device directing a view of the 3D object. In certain embodiments of the method, the 3D object includes an outer surface and at least one internal structure beneath the outer surface. In certain embodiments of the method, the current view includes at least one of a rotation of the at least a portion of the 3D object, an opacity of the outer surface and the internal structure, a level of zoom of the at least a portion of the 3D object, and a determination of whether at least one of the outer surface and the internal structure are selected. In certain embodiments of the method, the 3D object includes an outer surface and at least one internal structure beneath the outer surface, and wherein, when a current view is at a first point above the outer surface and the user selects to view the at least one internal structure from a second point beneath the outer surface, the current view transcends from the first point through the outer surface to the second point within the current view. In certain embodiments of the method, the method further includes generating a previewing of the transcending from the first point to the second point using a plurality of predetermined two-dimensional images. In certain embodiments of the method, the method further includes retrieving from storage and displaying within a current view at least one identification label associated with at least one item within the current view based on input received from the user. In certain embodiments of the method, the method further includes retrieving from storage and displaying at least one identification label for each of a plurality of items within the current view, determining a largest item displayed in the browser from among the plurality of items, and displaying the at least one identification label associated with the determined largest item. In certain embodiments of the method, the method further includes retrieving from storage and displaying at least one identification label for each of a plurality of items within the current view, determining at least one identification label to displayed based on at least one of a visibility of each of the plurality of items within the current view, the size of each of the plurality of items within the current view, the opacity of each of the plurality of items within the current view, the proximity of each of the plurality of items within the current view to the position of the current view, and the order of each of the plurality of items according to the 3D object, and displaying the determined at least one identification label. In certain embodiments of the method, the method further includes retrieving from storage and displaying a child identification label for each of a plurality of items within the current view, grouping each of the child identification labels into a parent identification label for the plurality of items within the current view, displaying the parent identification label for the plurality of items within the current view, receiving an expand query from a user to expand the parent identification label, and displaying each of the child identification labels for the plurality of items within the current view in response to the expand query. In certain embodiments of the method, the user selected view further includes links to retrievable information regarding at least one item within the current view. In certain embodiments of the method, the method further includes receiving, a first address associated with the initial default view or the user selected view of the 3D object and a second address associated with a second view of the 3D object, and displaying sequentially the initial default view or the user selected view of the 3D object in the web browser based on the first address and the second view of the 3D object in the web browser based on the second address. A current view of the 3D object transcends from the initial default view or the user selected view of the 3D object in the web browser to the second view of the 3D object in the web browser. In certain embodiments of the method, the first address and the second address are associated with Uniform Resource Locator links received from a second user, and wherein the display of the first view and the second view in the web browser are in response to activation of the URL links for the first address and the second address. Each of the first address and the second address can include a parameter defining, in a current view of the 3D object, an amount of time to display the current view. In certain embodiments of the method, the method further includes receiving a single address associated with the first address and the second address, and loading the single address in the web browser. The receiving the first address and the second address is in response to loading the single address in the web browser. In certain embodiments of the method, the method further includes receiving a search query of the 3D object from the user, and generating, for display, a portion of the 3D object responsive to the search query in response to the search query. In certain embodiments of the method, the portion of the 3D object responsive to the alphanumeric input is generated for display prior to the alphanumeric input being completed and submitted by the user for processing. In certain embodiments of the method, the method further includes providing at least one computer-generated search term, from a predetermined list of stored search terms associated with the searchable data, for display in response to alphanumeric input from the user, the at least one computer-generated search term being responsive to the alphanumeric input, and concurrently generating for display a portion of the 3D object associated with the selected computer-generated search term when the at least one computer-generated search term is generated for display.

According to another embodiment of the present disclosure, a system for viewing a three-dimensional (3D) object using a web browser having integrated 3D modeling capabilities is provided. The system includes a memory for storing data of a 3D object obtained via a web browser having integrated 3D modeling capabilities, and a processor. The processor is configured to receive a request to display, in the web browser, the 3D object based on an initial default view, or a user selected view based on a query received from a user, and display, in the web browser, at least a portion of the 3D object based on the initial default view, or the user selected view based on the query received from a user.

In certain embodiments of the system, the query is an input from a pointing device directing a view of the 3D object. In certain embodiments of the system, the 3D object includes an outer surface and at least one internal structure beneath the outer surface. In certain embodiments of the system, the user selected view includes at least one of a rotation of the at least a portion of the 3D object, an opacity of the outer surface and the internal structure, a level of zoom of the at least a portion of the 3D object, and a determination of whether at least one of the outer surface and the internal structure are selected. In certain embodiments of the system, the 3D object includes an outer surface and at least one internal structure beneath the outer surface, and wherein, when a current view is at a first point above the outer surface and the user selects to view the at least one internal structure from a second point beneath the outer surface, the processor is configured to transcend the current view from the first point through the outer surface to the second point within the current view. In certain embodiments of the system, the processor is further configured to retrieve from storage and display an identification label associated with at least one item within the current view. In certain embodiments of the system, the processor is further configured to retrieve from storage and display at least one identification label for each of a plurality of items within the current view, determine a largest item displayed in the browser from among the plurality of items, and display the at least one identification label associated with the determined largest item. In certain embodiments of the system, the user selected view further includes links to retrievable information regarding at least one item within the current view. In certain embodiments of the system, the processor is further configured to receive a first address associated with the initial default view or the user selected view of the 3D object and a second address associated with a second view of the 3D object, and display sequentially the initial default view or the user selected view of the 3D object in the web browser based on the first address and the second view of the 3D object in the web browser based on the second address. A current view of a 3D object transcends from the first view of the 3D object in the web browser to the second view of the 3D object in the web browser. In certain embodiments of the system, the first address and the second address are associated with URL links received from a second user, and wherein the display of the first view and the second view in the web browser are in response to activation of the URL links for the first address and the second address. In certain embodiments of the system, each of the first address and the second address include a parameter defining, in a current view of the 3D object, an amount of time to display the current view. In certain embodiments of the system, the processor is further configured to receive a single address associated with the first address and the second address, and load the single address in the web browser. The processor is configured to receive the first address and the second address is in response to loading the single address in the web browser. In certain embodiments of the system, the processor is further configured to receive a search query of the 3D object from the user web browser, and provide, in response to the request, for display a portion of the 3D object responsive to the search query in response to the search query.

According to a further embodiment of the present disclosure, a machine-readable storage medium includes machine-readable instructions for causing a processor to execute a method for viewing a three-dimensional (3D) object using a web browser having integrated 3D modeling capabilities is provided. The method includes obtaining data of a 3D object includes an outer surface and at least one internal structure beneath the outer surface via a web browser having integrated 3D modeling capabilities, and displaying, in the web browser, at least a portion of the 3D object based on an initial default view, or a user selected view based on a query received from a user. The user selected view includes at least one of a rotation of the at least a portion of the 3D object, an opacity of the outer surface and the internal structure, a level of zoom of the at least a portion of the 3D object, and a determination of whether at least one of the outer surface and the internal structure are selected.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

According to one embodiment of the present disclosure, a computer-implemented method for searching a display of a three-dimensional (3D) object using a web browser is provided. The method includes receiving a request for searchable data of a 3D object from a web browser and providing, in response to the request, the searchable data of the 3D object to the web browser for the web browser to display. The method also includes receiving a search query of the 3D object from a user, and generating, for display, a portion of the 3D object responsive to the search query in response to the search query.

In certain embodiments of the method, the web browser has built in 3D modeling and searching capabilities. In certain embodiments of the method, the search query is an alphanumeric input. In certain embodiments of the method, the portion of the 3D object responsive to the alphanumeric input is generated for display prior to the alphanumeric input being completed and submitted for processing by the user. In certain embodiments of the method, the method further includes providing at least one computer-generated search term, from a predetermined list of stored search terms associated with the searchable data, in response to alphanumeric input from the user, the at least one computer-generated search term being responsive to the alphanumeric input. In certain embodiments of the method, the method further includes concurrently generating for display a portion of the 3D object associated with the selected computer-generated search term when the at least one computer-generated search term is generated for display. In certain embodiments of the method, the method further includes concurrently generating for display a portion of the 3D object associated with the selected computer-generated search term upon selection of the at least one computer-generated search term. In certain embodiments of the method, generating for display a portion of the 3D object includes altering the display of a current view of at least a portion of the 3D object in response to the search query or a selected computer-generated search term to another view includes the portion of the 3D object associated with the selected computer-generated search term. In certain embodiments of the method, the method further includes receiving a modification of the alphanumeric input, providing another computer-generated search term, from the predetermined list of stored search terms associated with the searchable data, in response to the modification of the alphanumeric input from the user, the at least one computer-generated search term being responsive to the modification of the alphanumeric input, and generating for display a portion of the 3D object associated with the computer-generated search term responsive to the modification of the alphanumeric input.

According to another embodiment of the present disclosure, a system for viewing and searching a three-dimensional (3D) object using a web browser is provided. The system includes a memory that includes searchable data of a 3D object, and a processor. The processor is configured to receive a request for the searchable data of the 3D object from a web browser, and provide, in response to the request, the searchable data of the 3D object to the web browser for the web browser to display at least a portion of the 3D object according to a user selected view based on an alphanumeric search query received from a user.

In certain embodiments of the system, the web browser has built in 3D modeling and searching capabilities. In certain embodiments of the system, the processor is further configured to generate for display a portion of the 3D object responsive to the alphanumeric input. In certain embodiments of the system, the portion of the 3D object responsive to the alphanumeric input is generated for display prior to the alphanumeric input being completed and submitted for processing by the user. In certain embodiments of the system, the memory further includes a predetermined list of stored search terms associated with the searchable data, and wherein the processor is further configured to provide at least one computer-generated search term, from the predetermined list, in response to alphanumeric input from the user, the at least one computer-generated search term being responsive to the alphanumeric input. In certain embodiments of the system, the processor is further configured to concurrently generate for display a portion of the 3D object associated with the selected computer-generated search term when the at least one computer-generated search term is generated for display. In certain embodiments of the system, the processor is further configured to concurrently generate for display a portion of the 3D object associated with the selected computer-generated search term upon selection of the at least one computer-generated search term. In certain embodiments of the system, the processor being configured to generate for display a portion of the 3D object includes the processor being configured to alter the display of a current view of at least a portion of the 3D object in response to the search query or a selected computer-generated search term to another view includes the portion of the 3D object associated with the selected computer-generated search term. In certain embodiments of the system, the processor is further configured to receive a modification of the alphanumeric input, provide another computer-generated search term, from the predetermined list of stored search terms associated with the searchable data, in response to the modification of the alphanumeric input from the user, the at least one computer-generated search term being responsive to the modification of the alphanumeric input, and generate for display a portion of the 3D object associated with the computer-generated search term responsive to the modification of the alphanumeric input.

According to a further embodiment of the present disclosure, a machine-readable storage medium includes machine-readable instructions for causing a processor to execute a method for searching a display of a three-dimensional (3D) object using a web browser having integrated 3D modeling and searching capabilities is provided. The method includes receiving a request for searchable data of a 3D object from a web browser having built in 3D modeling and searching capabilities, and providing, in response to the request, the searchable data of the 3D object to the web browser for the web browser to display at least a portion of the 3D object based on an initial default view. The method also includes receiving an alphanumeric search input query from a user, and generating for display a portion of the 3D object responsive to the alphanumeric search input.

In certain embodiments of the method, the portion of the 3D object responsive to the alphanumeric input is generated for display prior to the alphanumeric search input being completed and submitted for processing by the user.

According to one embodiment of the present disclosure, a computer-implemented method for viewing a three-dimensional (3D) object using a web browser is provided. The method includes receiving a first address associated with a first view of the 3D object and a second address associated with a second view of the 3D object, and displaying sequentially the first view of the 3D object in the web browser based on the first address and the second view of the 3D object in the web browser based on the second address. A current view of the 3D object transcends from the first view of the 3D object in the web browser to the second view of the 3D object in the web browser.

In certain embodiments of the method, the first address and the second address are associated with URL links received from a second user, and wherein the display of the first view and the second view in the web browser are in response to activation of the URL links for the first address and the second address. In certain embodiments of the method, the current view of the 3D object transcending from the first view of the 3D object to the second view of the 3D object includes animating the transition from the first view of the 3D object to the second view of the 3D object. In certain embodiments of the method, each of the first address and the second address comprise parameters defining, in a current view of the 3D object, at least one of an amount of time to display the current view, a rotation of the at least a portion of the 3D object, an opacity of a structure of the 3D object, a level of zoom of the at least a portion of the 3D object, and a determination of whether a structure of the 3D object is selected. In certain embodiments of the method, each of the first address and the second address are URLs. In certain embodiments of the method, the method further includes receiving a single address associated with the first address and the second address, and loading the single address in the web browser, wherein the receiving the first address and the second address is in response to loading the single address in the web browser. In certain embodiments of the method, each of the single address, the first address, and the second address are URLs, and the first address and the second address are associated with the single address using a URL shortener. In certain embodiments of the method, in the second view, the 3D object includes an outer surface and at least one internal structure beneath the outer surface, and the method further includes adjusting, based on the position of a current view of at least one of the outer surface and the at least one internal structure of the 3D object in the second view, the level of opacity of at least one of the outer surface and the at least one internal structure within the current view. In certain embodiments of the method, the 3D object includes an outer surface and at least one internal structure beneath the outer surface, and wherein, when a current view of the 3D object in the first view is at a first point above the outer surface, and a current view of the 3D object in the second view is of the at least one internal structure from a second point beneath the outer surface, the first view transcends from the first point through the outer surface to the second point beneath the outer surface. In certain embodiments of the method, the method further includes receiving a request to display a third view of the 3D object, and providing a third address associated with the third view of the 3D object, wherein the third address includes parameters defining, in the view of the 3D object, at least one of a rotation of the at least a portion of the 3D object, an opacity of a structure of the 3D object, a level of zoom of the at least a portion of the 3D object, and a determination of whether a structure of the 3D object is selected.

According to another embodiment of the present disclosure, a system for viewing a three-dimensional object using a web browser includes is provided. The system includes a memory for storing viewable data of a 3D object obtained via the web browser, and a processor. The processor is configured to receive a first address associated with a first view of the 3D object and a second address associated with a second view of the 3D object, and display sequentially the first view of the 3D object in the web browser based on the first address and the second view of the 3D object in the web browser based on the second address. A current view of the 3D object transcends from the first view of the 3D object in the web browser to the second view of the 3D object in the web browser.

In certain embodiments of the system, the first address and the second address are associated with URL links received from a second user, and wherein the display of the first view and the second view in the web browser are in response to activation of the URL links for the first address and the second address. In certain embodiments of the system, the current view of the 3D object transcending from the first view of the 3D object to the second view of the 3D object includes animating the transition from the first view of the 3D object to the second view of the 3D object. In certain embodiments of the system, each of the first address and the second address comprise parameters defining, in a current view of the 3D object, at least one of an amount of time to display the current view, a rotation of the at least a portion of the 3D object, an opacity of a structure of the 3D object, a level of zoom of the at least a portion of the 3D object, and a determination of whether a structure of the 3D object is selected. In certain embodiments of the system, each of the first address and the second address are URLs. In certain embodiments of the system, the processor is further configured to receive a single address associated with the first address and the second address, and load the single address in the web browser, wherein the processor is configured to receive the first address and the second address is in response to loading the single address in the web browser. In certain embodiments of the system, each of the single address, the first address, and the second address are URLs, and wherein the first address and the second address are associated with the single address using a URL shortener. In certain embodiments of the system, in the second view, the 3D object includes an outer surface and at least one internal structure beneath the outer surface, and the processor is further configured to adjust, based on the position of a current view of at least one of the outer surface and the at least one internal structure of the 3D object in the second view, the level of opacity of at least one of the outer surface and the at least one internal structure within the current view. In certain embodiments of the system, the 3D object includes an outer surface and at least one internal structure beneath the outer surface, and wherein, when a current view of the 3D object in the first view is at a first point above the outer surface, and a current view of the 3D object in the second view is of the at least one internal structure from a second point beneath the outer surface, the processor is configured to transcend the first view from the first point through the outer surface to the second point beneath the outer surface.

According a further embodiment of the present disclosure, a machine-readable storage medium comprising machine-readable instructions for causing a processor to execute a method for viewing a three-dimensional object using a web browser is provided. The method includes receiving a plurality of URLs, each URL associated with a view of a 3D object, wherein the plurality of URLs are provided to the web browser, and receiving an activation of the plurality of URLs in the web browser. The method also includes displaying, sequentially, each view of the 3D object in the web browser based on the corresponding URL. A current view of the 3D object transcends between each view of the 3D object in the web browser based on the corresponding URL.

According to yet a further embodiment of the present disclosure, a computer-implemented method for providing an address indicative of a view of a three-dimensional object using a web browser is provided. The method includes receiving a request to display a view of the 3D object, and providing a first address associated with a first view of the 3D object. The first address includes parameters defining, in the view of the 3D object, at least one of a rotation of the at least a portion of the 3D object, an opacity of a structure of the 3D object, a level of zoom of the at least a portion of the 3D object, and a determination of whether a structure of the 3D object is selected.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed system uses a web browser with integrated (e.g., built in) 3D modeling and searching capabilities for viewing a 3D image or object, such as a web browser pre-installed with WebGL. Using the enhanced web browser, the user can view and transcend layers of the 3D image, each view having a separate Uniform Resource Locator (URL). For example, a user viewing a 3D model of the human body can start from an external view of the liver and transcend, layer by layer, through the liver in order to view a bile duct. The user can stop at any layer/level and investigate, in detail, the human body and use search queries, alphanumeric or otherwise, to locate certain details. A user's view of the 3D human body can roam over the surface at a given layer or gradually transcend from one layer to another in a seamless fashion, such as by transcending from one layer/structure to another by making the current layer/structure more transparent as the user leaves that layer/structure on the journey to the next layer/structure, or the user's view can traverse through the layers.

Exemplary Architecture

Figure 1:
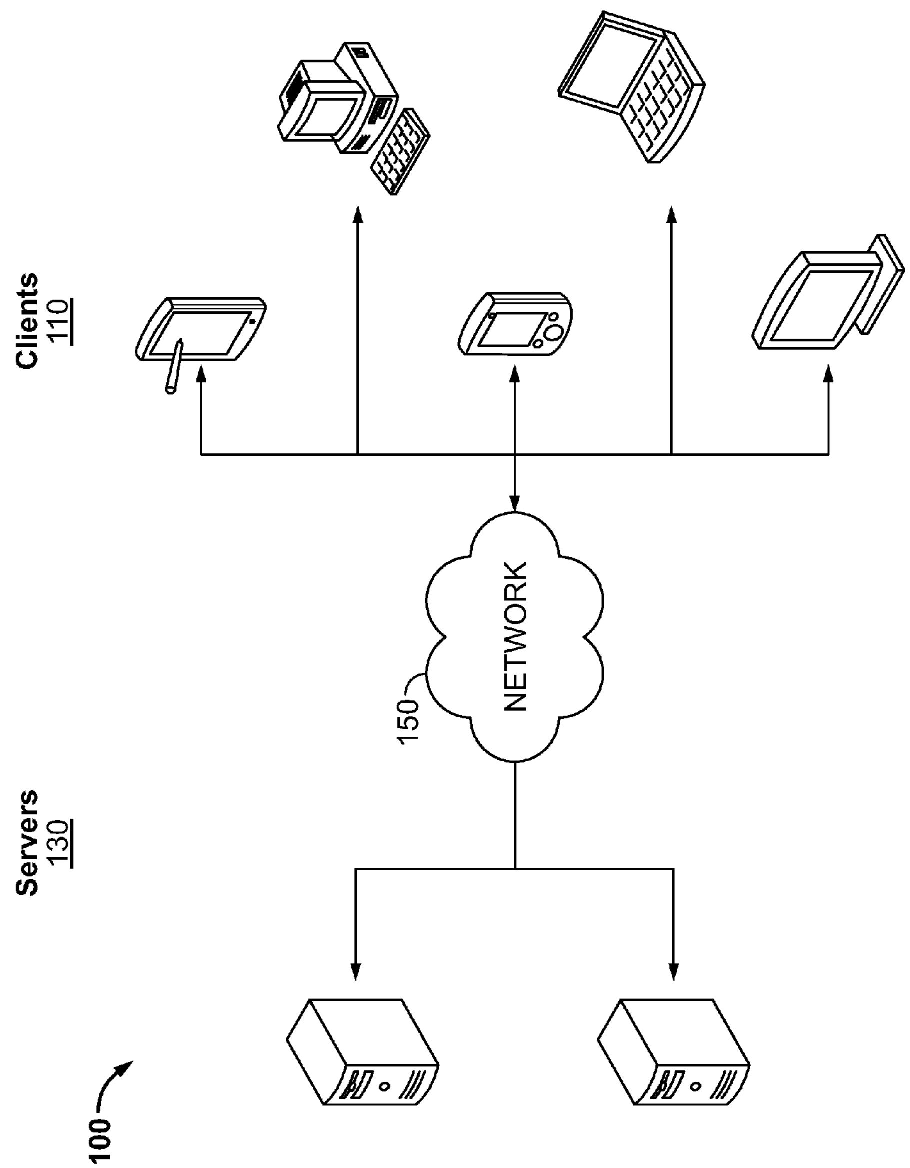
FIG. 1 illustrates an exemplary architecture for viewing and searching a 3D object using a web browser having integrated 3D modeling and searching capabilities.

FIG. 1 illustrates an exemplary architecture 100 for viewing and searching a 3D object using a web browser having integrated 3D modeling and searching capabilities. The architecture includes servers 130 connected to clients 110 over a network 150. The servers 130 are configured to host and/or provide searchable data of a 3D object, such as the human body, including related content such as web pages and user generated or provided content. In certain aspects, the searchable data of the 3D object includes a polygon mesh that defines the shape of a polyhedral object in 3D space that is representative of the 3D object. The searchable data can include identifiers of portions of the 3D object that can be searched using a query received from a user. For example, the searchable data of the 3D object can represent an organism, such as a human, dog, or ant, or an inanimate object such as a car engine. As another example, the searchable data of the 3D object can represent a 3D object having no internal structure, such as a sculpture, where the user in response to entering the query "head" is automatically shown the head of the sculpture. For purposes of load balancing, the searchable data can be hosted either on one or many separate servers 130.

The servers 130 can be any device having an appropriate processor, memory, and communications capability for hosting the searchable data of the 3D object and related content. The clients 110 to which the servers are connected over the network 150 can be, for example, desktop computers, mobile computers, tablet computers, mobile devices (e.g., a smartphone or PDA), set top boxes (e.g., for a television), video game consoles, or any other devices having appropriate processor, memory, and communications capabilities. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Each of the clients 110 is configured to receive part or all of the searchable data of the 3D object and display the searchable data to a user of the client 110 for the user to view in a 3D space, search, edit, and annotate. The user can view, at varying levels of detail, the 3D object from a position at any point outside or inside of the object, and can move the position of the view using an input device such as a keyboard, mouse, or a touchscreen. The user can also to choose adjust the opacity of portions of the 3D object, such as by reducing the opacity of a surface layer to zero in order to see through the surface layer and view an inner layer. The user can further search the 3D object by entering a query. For example, when the user types "lung," the opacity of the skin, muscular, and skeletal layers of a 3D human body is reduced and the position of the view is adjusted so that the user can see a lung. These features will be discussed in more detail herein below.

The searchable data of the 3D object is retrieved by the client 110 from the server 130 using a 3D enhanced application, such as a web browser or mobile application. The 3D enhanced web browser includes an integrated 3D modeling and searching capability that is built-in to the web browser, e.g., a part of the web browser by default, as a standard, at the time the web browser is downloaded and installed on the client 110. An exemplary 3D modeling and searching capability is provided by WebGL, a 3D graphics application programming interface. Exemplary 3D enhanced web browsers include web browsers pre-installed with WebGL.

Exemplary Client and Server

Figure 2:
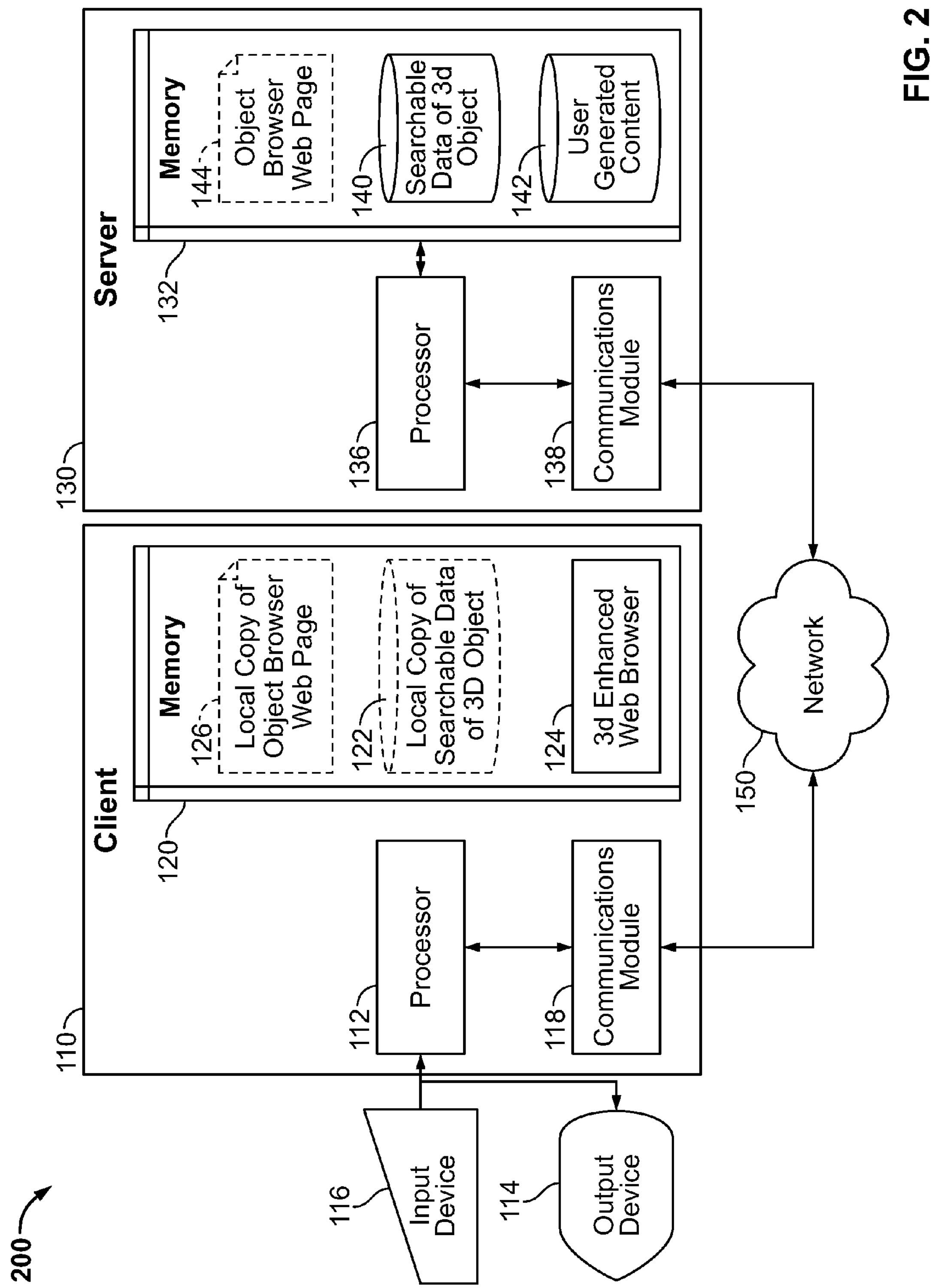
FIG. 2 is a block diagram illustrating an exemplary client and server in the architecture of FIG. 1 according to certain aspects of the disclosure.

FIG. 2 is a block diagram 200 illustrating an exemplary client 110 and server 130 in the architecture 100 of FIG. 1 according to certain aspects of the disclosure. The client 110 and the server 130 are connected over the network 150 via respective communications modules 118 and 138. The communications modules 118 and 138 are configured to interface with the network 150 to send and receive information, such as data, requests, responses, and commands to other devices on the network. The communications modules 118 and 138 can be, for example, modems or Ethernet cards.

The server 130 includes a processor 136, the communications module 138, and a memory 132. The memory 132 includes viewable and searchable data of the 3D object 140 ("searchable data of the 3D object 140"), a web page 144 for instructing a 3D enhanced web browser on how to model and search the 3D object (hereinafter "object browser web page 144") using the searchable data of the 3D object 140, and user generated content 142 related to the searchable data of the 3D object 140. The client 110 includes a processor 112, the communications module 118, an input device 116, an output device 114, and a memory 120. The memory 120 of the client 110 includes the 3D enhanced web browser 124 and optionally includes a local copy of the object browser web page 126 and a local copy of the searchable data of the 3D object 122. Thus, the object browser web page 144 and the searchable data of the 3D object 140 can be locally stored or remotely stored. A determination of whether to store a local copy of the object browser web page 126 and a local copy of the searchable data of the 3D object 122 can be made by the 3D enhanced web browser 124. For example, the 3D enhanced web browser 124 can include a setting of whether to store files in a local cache, or the object browser web page 144 itself can determine, for example, to stream only necessary information from the searchable data of the 3D object 140 to the client 110 and not store it in the memory 120 of the client.

The local copy of the object browser web page 126 and the local copy of the searchable data of the 3D object 122 are loaded into the memory 120 of the client 110 after a user of the client 110 (hereinafter simply "the user") selects the web address for the object browser web page 144 in the 3D enhanced web browser 124, and the 3D enhanced web browser 124 sends a request to the server 130 for the object browser web page 144 and related searchable data of the 3D object 140. The processor 136 of the server is configured to receive the request from the 3D enhanced web browser 124, and provide to the 3D enhanced web browser 124 of the client 110, in response to the request, the searchable data of the 3D object 140 and the object browser web page 144. The client 110 can then store the local copy of the object browser web page 126 and the local copy of the searchable data of the 3D object 122 in its memory 120. In the alternative, the web browser 124 of the client 110 downloads the searchable data of the 3D object 140 on demand (e.g., streaming), and/or an initial portion of the searchable data of the 3D object 140 is stored locally (e.g., as the local copy of the searchable data of the 3D object 122) to begin the display of the 3D object on the output device 114 and the remaining portion of the searchable data of the 3D object 140 is downloaded as requested or needed by the 3D enhanced web browser 140 for display on the output device 114.

The processor 112 of the client 110 is configured to execute instructions, such as instructions physically coded into the processor 112, instructions received from software in memory 120, or a combination of both. For example, the processor 112 of the client 110 is configured to execute instructions from the local copy of the object browser web page 126 causing the processor 112 to display, in the 3D enhanced web browser 124 on the output device 114, at least a portion of the 3D object based on an initial default view, or a user selected view based on a query received from the user using the input device 116. As discussed herein in more detail, a view of the 3D object can include features to provide an opacity of the different portions of the 3D object, rotation of the 3D object, zoom, whether any portion of the 3D object has been selected, the state of any interfaces displayed, parameters related to customization of the 3D object generated by a user, and any annotations on the 3D object. The output device 114 can be a computer display, such as a touch screen display. The query can be an alphanumeric input, such as "liver" or "2" (for cervical spinal nerve 2), or input from an input device 116. Similarly, the query can be an alphanumeric input indirectly related to a portion of the 3D object (e.g., for a human body, the entry "cirrhosis" can map to the liver) based on, for example, pre-defined mappings, user-generated contents, or implicit connections, such as prior user history. Exemplary input devices 116 include a keyboard, mouse, or touch screen display. Using the input device 116, the user can view any portion of the 3D object in the 3D enhanced web browser 124 from any angle at any position inside or outside the 3D object. The user can also use the input device 116 to search the 3D object and create, edit, and delete user generated content 142 related to the 3D object that is displayed on the output device 114.

Although the block diagram 200 illustrates, in the same memory 132 of a single server 130, the searchable data of the 3D object 140, the user generated content 142, and the object browser web page 144, the searchable data of the 3D object 140, the user generated content 142, and the object browser web page 144 can be in different memories and/or on different servers 130 as discussed above with reference to FIG. 1.

Obtaining Searchable Data for a 3D Object on the Client

Figure 3:
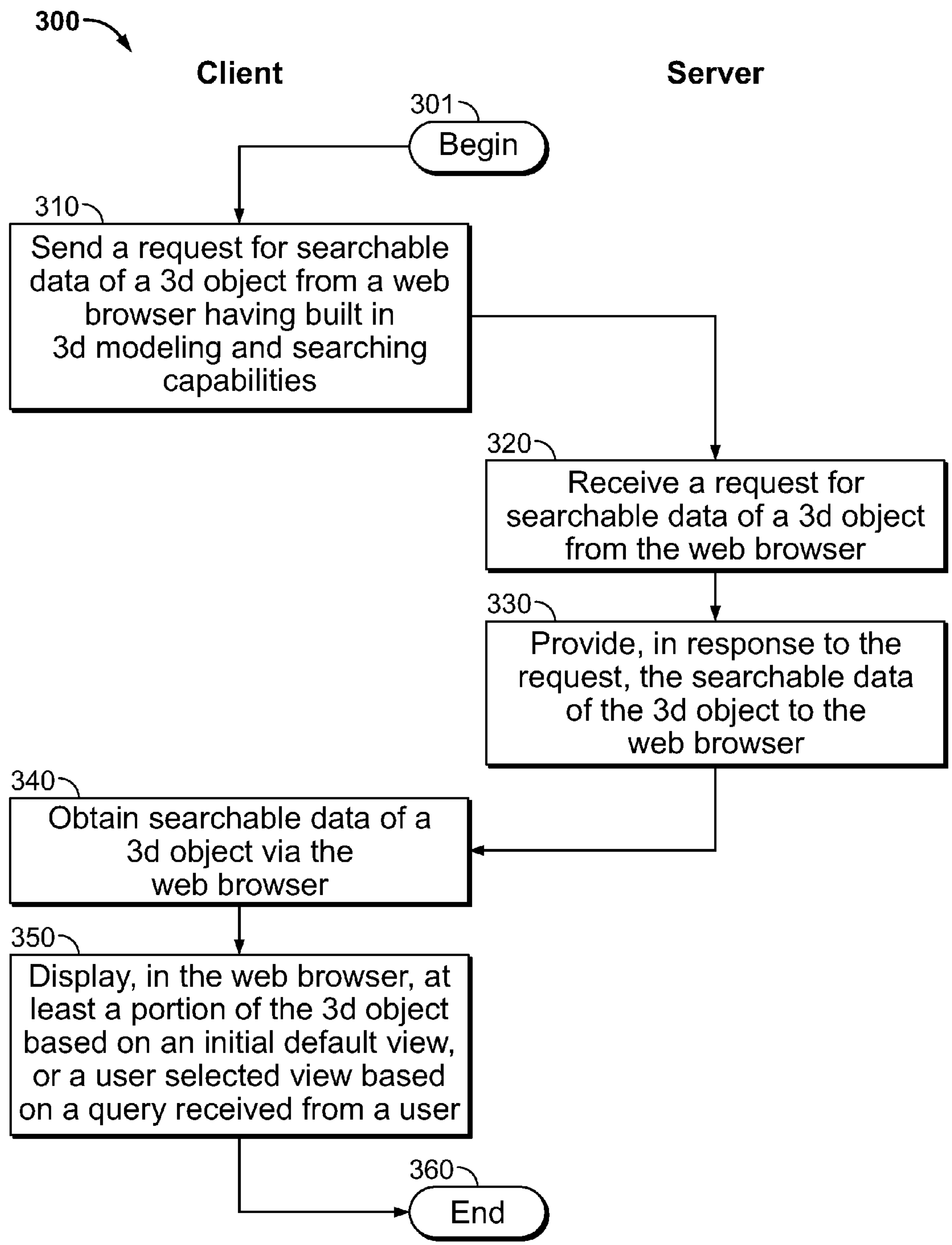
FIG. 3 illustrates an exemplary process for obtaining searchable data of a 3D object from the server of FIG. 2 using the 3D enhanced web browser of the exemplary client of FIG. 2

FIG. 3 illustrates an exemplary process 300 for obtaining searchable data of the 3D object from the server 130 of FIG. 2 using the 3D enhanced web browser 124 of the exemplary client 110 of FIG. 2.

The process 300 begins by proceeding from step 301 to step 310 when the user of a client 110 loads the 3D enhanced web browser 124 and enters an address, such as a Uniform Resource Locator (URL), for the viewable and searchable 3D object web page. In step 310, the 3D enhanced web browser 124 sends a request to the server 140 for the web page 144 and its related searchable data of the 3D object 140. In step 320, the server 130 receives the request. A copy of the searchable data of the 3D object 140 is available on the server 130 to provide in response to the request.

The copy of the related searchable data of the 3D object 140 and a copy of web page 144 is provided in step 330 by the server 130, in response to the request from the client 110, to the 3D enhanced web browser 124 on the client 110. In step 340, the client 110 obtains the copy of the web page 144 and a copy of the searchable data of the 3D object 140 via the 3D enhanced web browser 124. A local copy of the web page 126 and a local copy of the searchable data of the 3D object 122 are stored in the memory 120 of the client 110. In step 350, the client 110 uses a monitor 114 to display the exemplary screenshot of an initial default view of the 3D object loaded in the 3D enhanced web browser 124 as shown in FIG. 4A, and the process 300 ends in step 360.

Viewing the 3D Image in a 3D Enhanced Web Browser

Figure 4A:
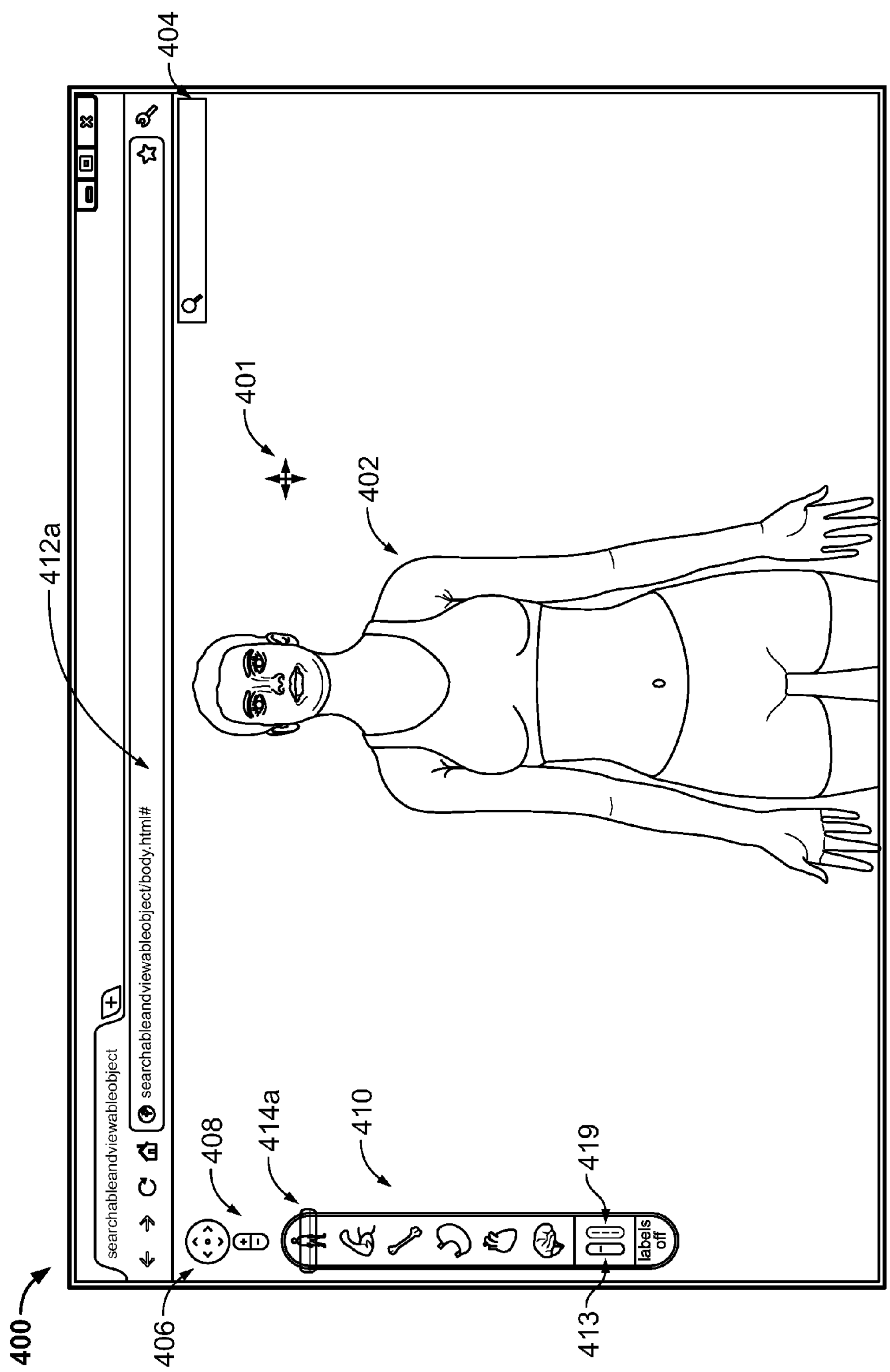
FIGS. 4A-4I are exemplary screenshots of viewing and searching a 3D object using a web browser having integrated 3D modeling and searching capabilities on the exemplary client of FIG. 2.

Having obtained searchable data of the 3D object at the client 110 from the server 130 using the 3D enhanced web browser 124, FIG. 4A illustrates a screenshot 400 of an initial default view of a 3D object 402 as displayed on the output device 114. In exemplary FIGS. 4A-4G, the 3D object is a human body. The initial default view shows an outer surface of a portion of a 3D object 402, a female human body, and more specifically, the outside of a clothed female human body, including skin. Although a female human body is used in the screenshots, a male human body can also be used. Furthermore, although a human body is used in the screenshots, another 3D object could be used.

The user interface of FIG. 4A includes the 3D object 402, an input field 404 for entering a query to be searched, a position control 406 for moving the position of the current view, a zoom control 408 for adjusting the zoom of the current view, and an opacity adjustment interface 410 (hereinafter referred to as "slider 410") having a movable indicator **414*a* for adjusting the opacity of the outer surface and/or internal structures (collectively referred to as "layers") of the 3D object 402**. As discussed herein, the outer surface includes, but is not limited to, the skin and portions of the body near to or in contact with the external surface of the skin, such as eyes, hair, teeth, ears, nails, and lips. The internal structures include, but are not limited to, inner anatomical layers, biological systems, and organs, down to the tissues, cells, and molecular structures such as DNA or proteins.

Any part of the 3D object 402, whether as a whole or in part, let alone any part of the outer surface or the internal structures, are often referred to herein as "portions" or "items" of the 3D object 402 and can be displayed by the 3D enhanced web browser 124 using the searchable data of the 3D object 140. Furthermore, in addition to the displayed user interface controls 406, 408, and 410, the user can use the input device 116, illustrated by cursor 401, to change the position of the view and the level of zoom of the view of the 3D object 402 to view any portion of the 3D object 402 from any angle (e.g., not limited to any axis). For example, the user can view the heart from the outside of the heart or the inside of the heart. As another example, the user can press and hold a button on a mouse input device 116 while dragging the cursor 401 across the screen in any direction in order to rotate the 3D object 402 in that direction.

In certain aspects, the 3D object 402 is viewable using a modified axial navigation model. Vertical user camera position control (e.g., up and down mouse gestures or keystrokes)

shifts the 3D object 402 vertically in the view and horizontal user camera position control (e.g., left and right mouse gestures or keystrokes) rotate the 3D object 402 horizontally. The axial navigation model allows significant visibility of a vertically oriented model without the navigational complexity and disorientation that can occur in 3D displays with more degrees of navigational freedom. As such, the 3D object 402 can be a vertically or horizontally oriented model. In order to facilitate viewing of the top or bottom of a vertically oriented 3D object 402 presented axially, an additional feature added to the camera view modifies the navigational surface of the 3D object from which the camera view is positioned. Specifically, instead of a limited X/Y navigation over a notional cylinder, the navigational surface of a vertically oriented 3D object 402 is a cylinder with hemispherical ends (e.g., at the top and bottom). The modification permits viewing of the top or bottom of a vertically oriented 3D object 402 while retaining the navigational simplicity of the X/Y model.

Any internal structure or portion of the 3D object 402 can be rendered by the 3D enhanced web browser 124 and viewed from any position using the searchable data of the 3D object 140, including, with reference to a human body, inner anatomical layers, biological systems, organs, tissues, cells, and molecular structures.

Local Data Retrieval and Remote Data Streaming

The processor 112 of the client 110 is configured to retrieve, either from the local copy of the searchable data of the 3D object 122 on the client 110 or the searchable data of the 3D object 140 on the server, sufficient searchable data to render the 3D object 402 in response to a query from the user. For example, based on the position of the user's cursor 401 and the associated changing of the view of the 3D object 402, the searchable data 122 or 140 is being retrieved, from the memory 120 on the client 110 or the memory 132 of the server 130, for processing by the processor 112 and display on the output device 113. In certain aspects, the amount of searchable data 122 or 140 retrieved depends on the position of the cursor 401 (e.g., within the 3D space) and the current view.

In certain aspects, the searchable data of the 3D object 140 is retrieved from the memory 132 of the server 130 for storage on the client 110 all at once, as discussed above with reference to FIG. 3. In certain aspects, the searchable data of the 3D object 140 is streamed from the memory 132 of the server 130 as needed by the processor 112 of the client 110 for displaying on the output device 113 to render the 3D object 402 in response to a query from the user.

Specifically, the level of detail of the displayed portion of the 3D object 402 can be streamed to the client 110 for display by the processor 112 based on the proximity of the user's current view to the portion of the 3D object 402. In certain aspects, lower-resolution textures of the 3D object are first downloaded by the client 110, and higher-resolution textures are later downloaded if the user's current view increases in proximity to a portion of the 3D object 402. Furthermore, levels of detail need only be downloaded once. For example, if a lower-resolution texture A is downloaded for a portion of the 3D object 402, and it is followed by a download of a higher-resolution texture B for the same portion, the higher-resolution view of the portion of the 3D object 402 is synthesized incrementally by the higher-resolution texture B being limited to the difference from the lower-resolution texture A (e.g., texture B is added into texture A). This is accomplished using standard web browser image file formats and scripting capabilities.

By way of example, the current view in FIG. 4A shows the external surface of the 3D object 402, the human body, where the human heart would not normally be visible. Accordingly, the processor 112, based on instructions from the local copy of the object browser web page 128, can request that only the searchable data for the outer surface of the 3D object 402 be provided to the client 110 in order to render the current view. If the user changes the current view to another view (e.g., of the human heart) or requests a more detailed rendering of the current view, either of which requiring additional searchable data of the 3D object 140 for rendering, then that additional searchable data can be streamed from the server 130 to the client 110 for rendering.

In certain aspects, the 3D object 402 can be previewed using two-dimensional (2D) previewing. The server 130 can rotate the 3D object 402 in increments and capture a view from each position as an image. The images can then be appended together, for example, using a thumbnail strip ("thumbstrip") graphic. The sequence of images can then be provided for presentation in an application that does not have integrated 3D modeling and searching capabilities. The sequence of images, when displayed sequentially, would appear as a 2D movie of the associated rotation of the 3D object 402.

Bookmarks

The initial default view 400 is associated with the URL 412*a* displayed, "http://viewableandsearchableobject/body.html#." The address or URL 412*a* for each view (also referred to as a "bookmark") is unique to the view and can be shared with other users to allow the other users to see the same view the sharing user sees. The bookmark captures the view of the 3D object 402 in a URL, and includes parameters identifying the view, such as an amount of time to display the view, the opacity of the layers of the 3D object 402, rotation of the 3D object 402, zoom, whether any portion of the 3D object 402 has been selected, the state of the slider 410, parameters related to customization of the 3D object 402 generated by a user, and any annotations on the 3D object 402. In certain aspects, these parameters are included after a hash "#" symbol in the URL 412*a*. When parameters of the 3D view change (e.g., portions are selected/deselected, portions change opacity, the position of the view changes), the parameters in the URL are updated. In certain aspects, the update occurs after a predetermined amount of time in order to avoid creating a significant number of URL entries (e.g., in the URL storage history) of the web browser 124. Such state representation within the URL 412*a* allows for navigation back to previous views by pressing a previous page view button in the web browser 124 (e.g., a practical form of "undo" without having to implement an undo mechanism).

The bookmark can also be shared with another user by sending a link to the URL (e.g., URL 412*a*) to the other user by, for example, simply copying the URL and pasting it into an email. When the other user loads the shared URL in a 3D enhanced web browser, the other user will see the same view seen by the user who shared the URL.

Layer Slider

Figure 4B:
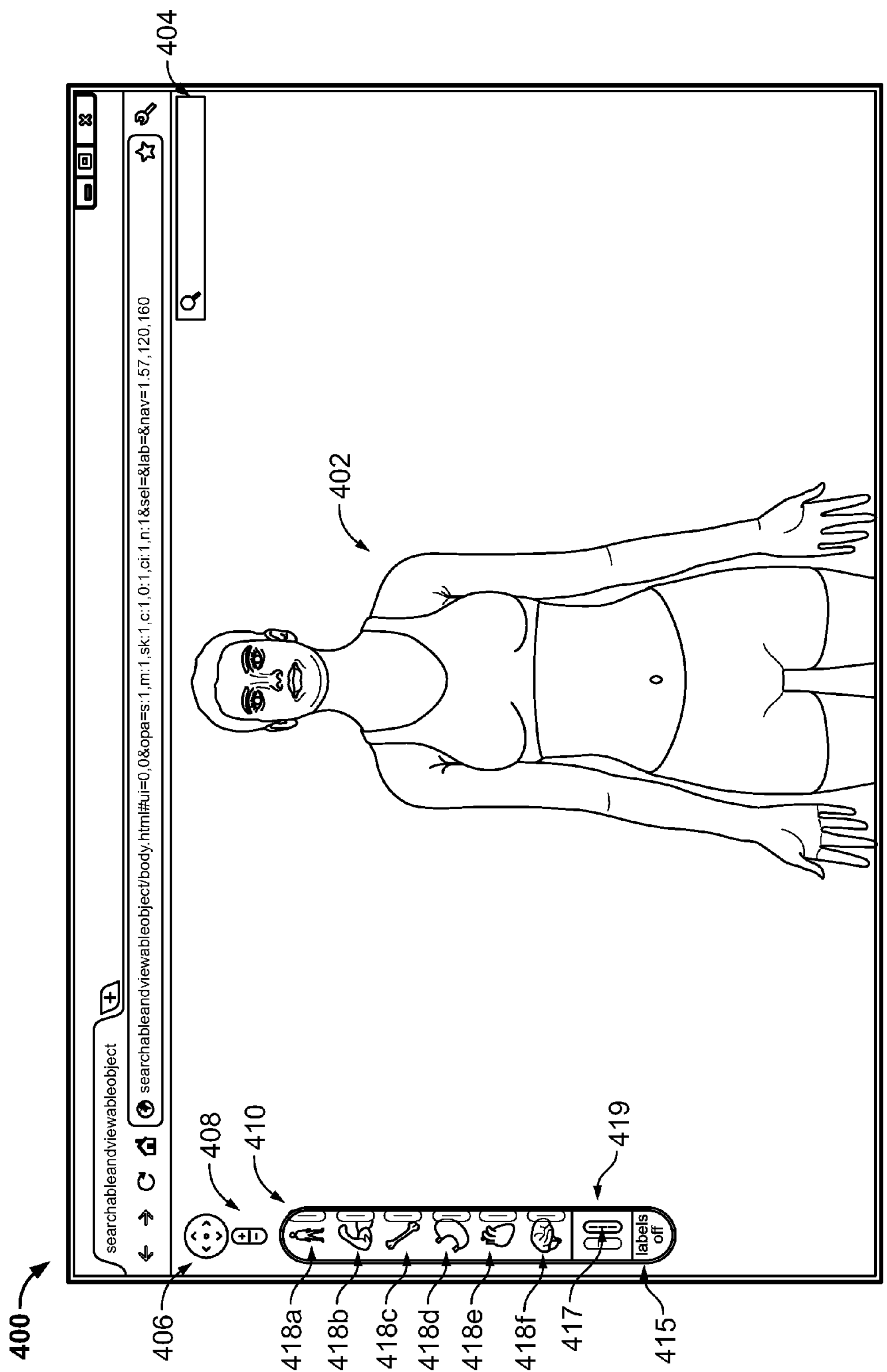

FIG. 4B is an exemplary screenshot of the 3D enhanced web browser 124 from the viewing angle of FIG. 4A after the slider 410 has been switched from a global adjustment mode in FIG. 4A to an individual adjustment mode. The processor 112 is configured to display the layer slider 410, which includes a labels button 415 for choosing to display selected labels of the portions of the 3D object 402 from the current view, a selection mechanism 418 for selecting between a global adjustment mode of layers, namely the outer surface and/or internal structures, of the 3D object 402, and an individual adjustment mode of layers, and a plurality of horizontal slide indicators 418*a-f*, namely, a horizontal slide indicator for the skin 418*a*, a horizontal slide indicator for the muscular system 418*b*, a horizontal slide indicator for the skeletal system 418*c*, a horizontal slide indicator for the organ system 418*d*, a horizontal slide indicator for the circulatory system 418*e*, and a horizontal slide indicator for the nervous system 418*f*, configured to move along a x-axis and adjust the opacity of their respective 3D human body portions.

Returning to FIG. 4A, which illustrates the slider 410 in a global adjustment mode designated by a first selection 413 of the selection mechanism 419, the slider 410 includes a vertical slide indicator 414*a* configured to move along a y-axis. The position of the vertical slide indicator 414*a* along the y-axis jointly affects the opacity of portions of the 3D object 402. For example, when the vertical slide indicator 414 is at an uppermost position, as illustrated in FIG. 4A, all portions of the 3D object 402 are opaque and the view is limited to the external surface of the 3D object 402. As the vertical slide indicator 414*a* moves down the y-axis of the slider 410, portions of the 3D object 402 become less opaque in order of inward movement, e.g., first the skin becomes less opaque, then the muscular system becomes less opaque, and so on, until the nervous system is made less opaque. When the vertical slide indicator 414*a* moves up the y-axis of the slider 410, portions of the 3D object 402 become more opaque in the opposite order that they were made less opaque when the vertical slide indicator 414*a* moved down the y-axis of the slider 410.

Returning to FIG. 4B, which illustrates the slider 410 in the individual adjustment mode designated by a second selection 417 of the selection mechanism 419, the slider 410 includes the horizontal slide indicators 418*a-f* configured to move along the x-axis. The position of the horizontal slide indicators 418*a-f* in FIG. 4B reflects the specific opacity of their respective 3D human body portions from the screenshot 430 of FIG. 4A. In FIG. 4B, the horizontal slide indicator for the skin 418*a*, the horizontal slide indicator for the muscular system 418*b*, the horizontal slide indicator for the skeletal system 418*c*, the horizontal slide indicator for the organ system 418*d*, the horizontal slide indicator for the circulatory system 418*e*, and horizontal slide indicator for the nervous system 418*f* are in the rightmost position, indicating that the skin, the muscular system, the skeletal system, the organ system, the circulatory system, and the nervous system of the 3D object 402 are completely opaque. However, each of these layers is configured to become less opaque (i.e., more transparent) as their corresponding horizontal slide indicator 418*a-f* moves towards the left. If a horizontal slide indicator 418*a-f* is in a leftmost position, the corresponding layer is transparent (i.e., not opaque). Similarly, if a horizontal slide indicator 418*a*-418*f* is in an intermediate position between a leftmost position and a rightmost position, the corresponding layer would be partially opaque.

In certain aspects not illustrated, both the vertical slide indicator 414*c* and the horizontal slide indicators 418*a-f* can be displayed together, such that the adjustment of one type of indicator on the slider 410 automatically affects the position of the other type of indicator on the slider 410.

Search

Figure 4C:
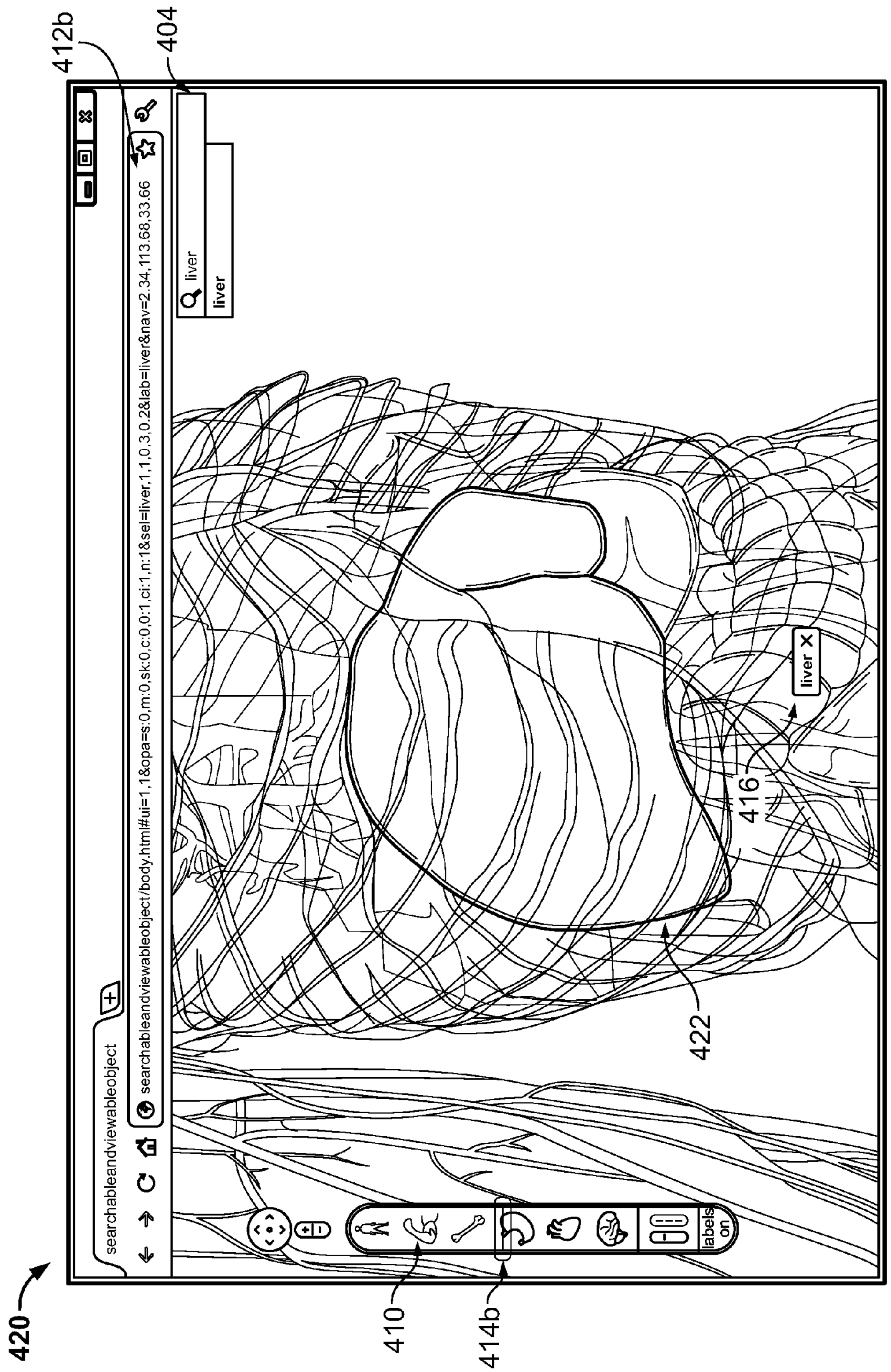

FIG. 4C is an exemplary screenshot of the 3D enhanced web browser 124 from another view, specifically, a view responsive to the user entering the query "liver" into the input field 404. The user can enter any query into the input field 404, and any portions of the 3D object 402 matching the query will be identified, selected, and displayed in the 3D enhanced web browser 124. The view of FIG. 4C, which is identified by and retrievable with the URL 412*b* "http://viewableandsearchableobject/body.html#ui=1,1&opa=s:0,m:0,sk: 0,c:0,o:1,ci:1,n:1&sel=Liver,1,1,0.3,0.2&lab=Liver&nav=2.34,113.68,33.66" reflects a transition from the initial default view 400 of FIG. 4A and its related URL 412*a* to the view illustrated. A label 416 for the liver is displayed in response to the query.

Navigation Via Searching, Autocompletion, and Instant Navigation

The input field 404 is configured to provide the features of navigation via searching, autocompletion, and instant navigation via autocompletion. With navigation via searching, as the user begins entering a query into the input field 404, the current view of the camera is adjusted to display the first term matching the currently entered query in the input field. For example, as the user types the query "liver," the intermediate query "l" identifies the shortest matching term, "lung," displays the term, and changes the current view of the 3D object 402 to a view of the lung. When the intermediate query becomes "li," the shortest matching term, "liver," is identified and displayed, and the current view of the 3D object 402 changes from a view of the lung to a view of the liver as illustrated in FIG. 4B. In certain aspects, the current view of the camera is adjusted to display a portion of the 3D object 402 after a term is selected or otherwise submitted to the input field by the user.

Autocompletion provides the user with suggested (or "computer generated") results displayed below the input field 404 that match the user's currently entered query in the input field 404. For example, as the user types the query "liver," the intermediate query "l" identifies suggested results, in order of word length, of: lung, liver, lunate, lacriminal, lumbrical, levator ani, lumbar disc, longus colli, fan ligament, and fibrous loop. In certain aspects, the suggested results can be listed in order of popularity. If the user cycles through the identified suggested results, such as by using the keyboard cursor to select any of these results, the current view of the 3D object 402 will change from viewing one identified suggested result to the next (e.g., from a view of the liver to a view of the lunate), which is known as instant navigation via autocompletion. After the user types "i" to make the intermediate query "li," a single suggested result of "liver' is identified, as illustrated in FIG. 4B.

Transcending Layers and Automatic Hiding and Showing Layers

When the position of the current view of the 3D object 402 changes in response to a query that is received from the user, the position can pass through, "transverse," or "transcend" through the layers (e.g., transcending can include both ascending through a layer or descending through a layer). At the same time, the opacity of the layers of the 3D object 402 changes.

For example, returning to the exemplary screenshot from FIG. 4A, the current view is of the outer surface of the 3D object 402. The layers of the 3D object 402 are completely opaque as illustrated by the position of the indicator 414*a* on the slider 410, which is at an uppermost position. When the current view transcends from an external layer, through the external layer, to an internal layer, or more specifically from the outer surface of the 3D object 402 through to an internal structure, the liver, in FIG. 4C, the opacity of the layers of the 3D object 402 are automatically changed to facilitate viewing of the liver. During this process, the view displays to the user a transcending through the three most external layers, the skin, the muscular system, and the skeletal system, as those layers are made less opaque so that the layer at which the liver is present, the organ system, is more viewable to the user. The processor 112 is configured to adjust, based on the position of the user's current view, the level of opacity of the layers, and the processor 112 is further configured to transcend the current view from a first point on one side of a layer, through the layer, to a second point on the other side of the layer.

Selection and Groups

When a portion of the 3D object 402 is selected, it is made more opaque/solid than neighboring portions of the 3D object 402, and an appropriate label (e.g., in the context of the human body, medical label) for the selected portion is displayed. In certain aspects, multiple portions of the 3D human 502 can be selected, either simultaneously or serially. A portion or multiple portions of the 3D object 402 can be selected in response to a query by a user, whether the query is a search using the input field 404 or a selection or using a input pointing device 116 (e.g., by clicking with a mouse or by using a lasso-type pointer or using marquee selection).

In certain aspects, the selection of multiple portions of the 3D object 402 can be selected by rendering the portions (e.g., model entities) of the 3D object 402 in distinct flat colors in an off-screen buffer, and then checking the pixel color under the cursor position. Multiple levels of selection can exist, such as, for example, when a portion(s) of the 3D object 402 is selected, the remaining portions of the 3D object 402 are made translucent on a first level and the selected portion(s) are made opaque on a second level. The user can choose between levels of selection via a user interface gesture such as, for example, by again selecting (e.g., via a mouse click) the selected portion of the 3D object 402.

The query by the user can include use of a selection tool that allows selection of one or multiple portions of the 3D object 402, and that can further allow the user to select one or multiple portions of the 3D human body to hide or otherwise reduce the visibility of those portions so as to better view other portions that were obscured by the now-hidden portions. In certain aspects, a selected portion of the 3D object 402 can be fixed to a certain opacity level (e.g., completely opaque or completely transparent) by selecting that portion, selecting a label associated with that portion, and/or switching to a "pin" mode. In pin mode, an additional interface can be provided that allows: portions of the 3D object 402 to be "pinned" (e.g., fixed to a certain opacity level), pinned portions of the 3D object 402 to be highlighted, pinned portions of the 3D object 402 to be listed (e.g., which checkboxes to pin/un-pin portions of the 3D object 402), and groups of pinned portions of the 3D object 402 to be unpinned.

In certain aspects, the user can select and isolate any portion of the 3D object 402 for viewing. For example, the user can select a user-defined portion of the forearm of the 3D object 402 using a lasso type tool and make the rest of the 3D object 402 transparent, and then view the user-defined portion of the forearm from any angle. This is accomplished, for example, using selection-specific navigation. In certain aspects, selection-specific navigation extends axial model navigation by generating a bounding box around one or more selected entities (e.g., selected via search or mouse click). A navigational surface, such as a cylindrical or bihemispherical surface, is fitted to the bounding box. Thus, when a user selects a portion of the 3D object 402, the user is automatically zoomed in to a closer view of the selected portion of the 3D object 402 that centers upon the selected portion. The remaining portions of the 3D object 402 can be made more transparent (e.g., invisible), thereby allowing the user to focus on the selected portion of the 2D object without increasing the complexity of the axial navigation paradigm. When the user deselects the portion of the 3D object 402, the user can be zoomed out to a farther-out view in which the rotational axis of the view passes through the center of the 3D object 402.

When a portion of the 3D object 402 is selected, including by selecting a label associated with that portion, the view of the selected portion can be refined and/or enhanced by adjusting the opacity of certain portions of the 3D human body as well as adjusting the zoom. The selected portions of the 3D object 402 can be related (e.g., in response to a query for "rotator cuff," the muscles of the rotator cuff, the supraspinatus, infraspinatus, teres minor, and subscapularis can be selected together) or arbitrary (e.g., the user can select any number of portions of the 3D human body by clicking them with a mouse). These selected portions can be identified and stored as a group. The information on the group can be stored remotely in the user generated content 142 database in the memory 132 of the server 130. The group can be an arbitrary group of body portions or a related group of body portions.

Selective Labeling

Figure 4D:
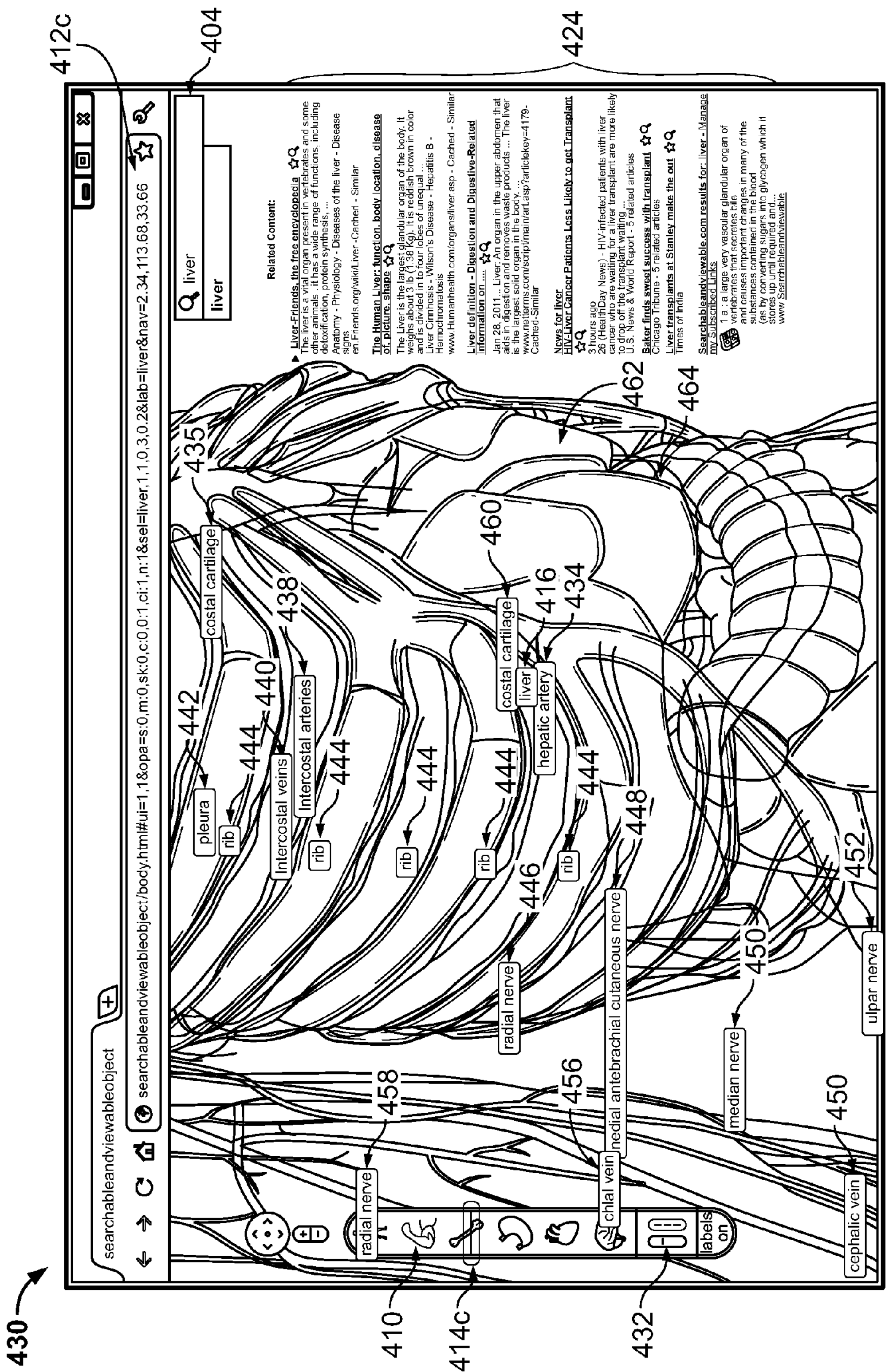
Figure 4E:
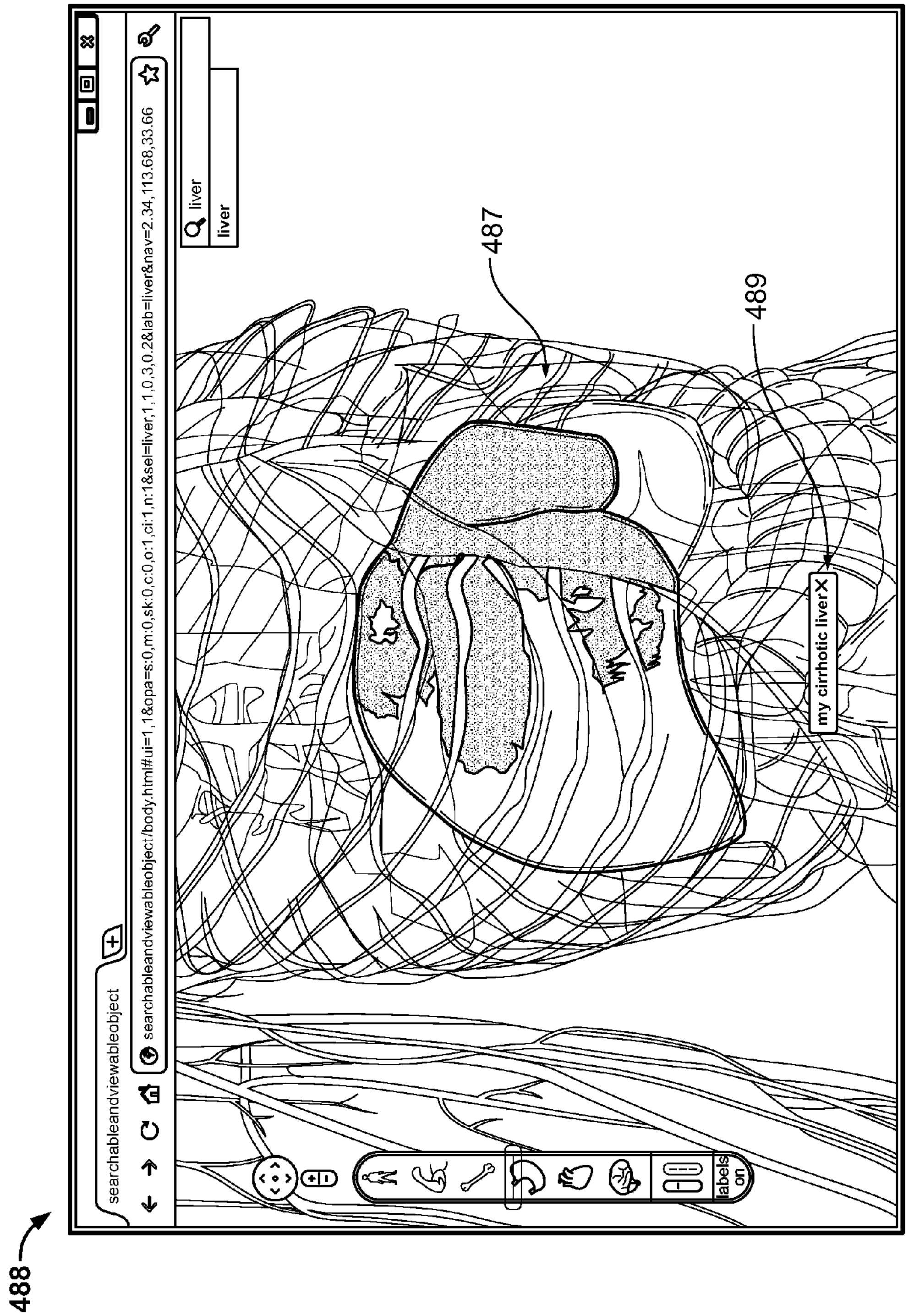
Figure 4F:
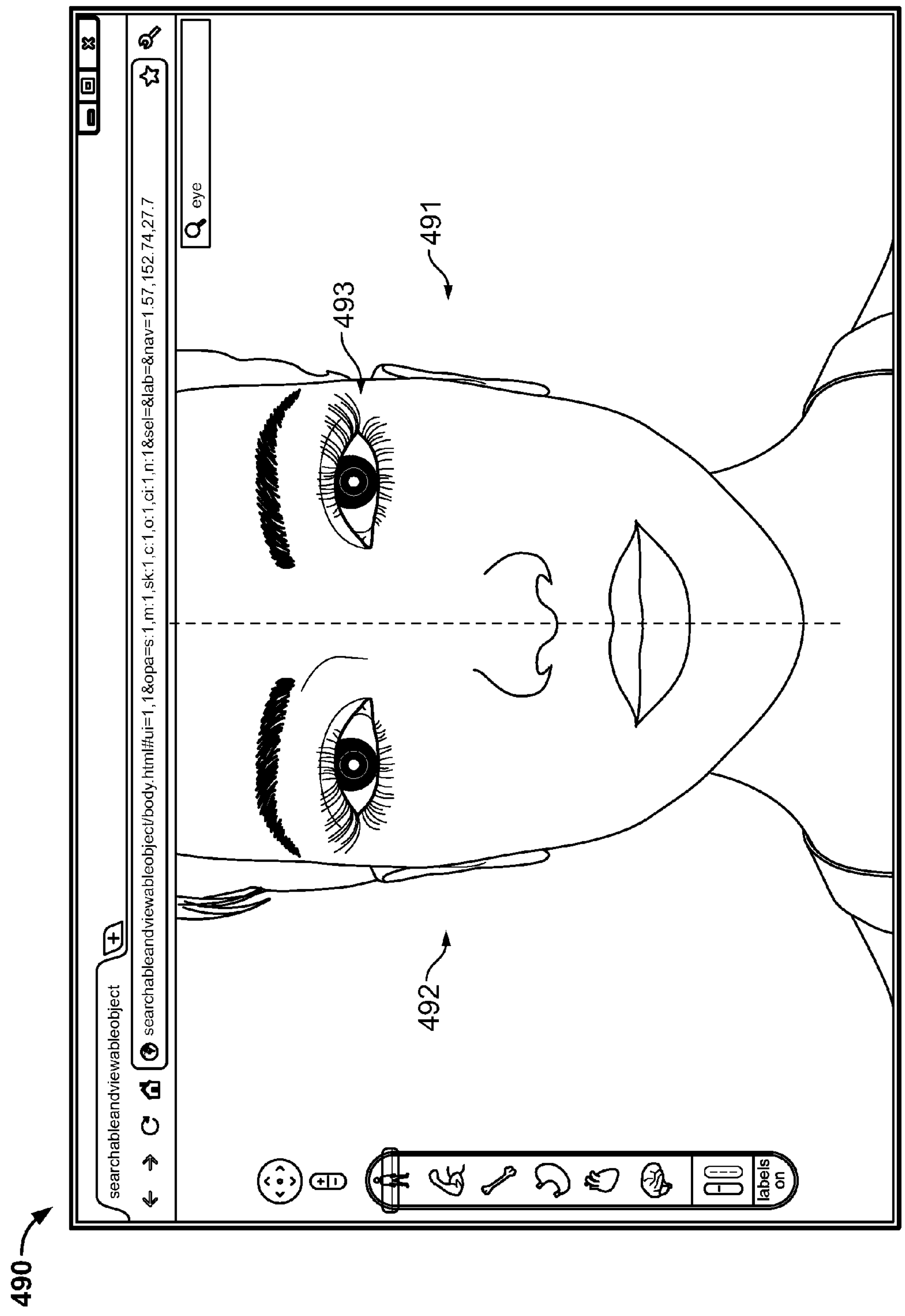

FIG. 4D is an exemplary screenshot 430 of a view of a portion of the 3D object 402 in the 3D enhanced web browser 124, namely, a view of a human liver after the opacity of certain layers of the 3D object 402 have been modified. A labeling option 432 on the slider 410 to display all relevant labels in the current view has been activated and the indicator 414*c* has been moved up to increase the opacity of the skeletal system layer. The current view of FIG. 4D is identified by and retrievable with the URL 412*c* "http://viewableandsearchableobject/body.html#ui=1,1&opa=s:0,m:0,sk:0.6,c:0.6,o:1,ci:1,n:1&sel=&lab=&nav=2.34,113.68,33.66."

The exemplary screenshot 430 of FIG. 4D includes a display of many labels 416 and 434 to 460 identifying portions of the 3D object 402. The displayed labels 416 and 434 to 460 are selected for display from a larger group of labels reflecting any portion of the object 402 within the bounds of the viewing area of the 3D enhanced browser 124. The labels 416 and 434 to 460 that are selected for display are selected based on a determination of large structures displayed in the 3D enhanced browser 124 from among the layers of labels that can be displayed and the plurality of structures that are displayed. Thus, in certain aspects, the selected labels that are displayed are limited to the layer of the body being viewed and limited to a given area of the view (e.g., like a "flashlight"). For example, in certain instances, labels that are within a certain radius surrounding the current position of the view or a mouse pointer are displayed. With reference to FIG. 4D, although the spleen 462 and stomach 464 are displayed in the 3D enhanced browser 124, labels for the spleen 462 and stomach 464 are not displayed. On the other hand, a costal cartilage label 460, a liver label 416, and a hepatic artery label 434, which are near the spleen 462 and stomach 464, are displayed, because the associated costal cartilage, liver, and hepatic artery are determined to be large structures within the display of the 3D enhanced browser 124.

In certain embodiments, labels can be selected for display based on other determinations, such as by weighting. For example, based on a current view of a 3D object 402, a determination is made regarding the visibility of portions of the 3D object 402, the size of portions of the 3D object 402, the opacity of portions of the 3D object 402, the proximity of portions of the 3D object 402 to the current view, and the order of layers of the 3D object. Heavier weights are assigned to portions of the 3D object 402 that are more visible, larger, more opaque, closer to the current view, and nearer to the outermost layer of the 3D object. A determination is then made to display labels for portions have sufficient weight, such as a weight greater than or equal to a predetermined threshold weight.

Annotations

The user can further generate annotations for any portion of the 3D object 402 for display in the 3D enhanced web browser 124. In certain aspects, annotations are a special type of label that otherwise follow the rules for displaying labels disclosed above and are searchable using the input field 404. Annotations include user-defined labels. The user can assign annotations to one or many portions of the body, such as by creating an arbitrary group of body parts and assigning the arbitrary group an annotation. These annotations can be shared in, and displayed with, the bookmarks described above. For example, the content, location, and display parameters of an annotation can be stored as part of the URL of the bookmark. The annotations can be stored in the user generated content 142 database in the memory 132 of the server 130 for accessibility and viewing by other users.

The annotations can include text describing the associated body portion, such as a definition of the associated body portion or an explanation of a medical procedure or condition related to the associated body portion. The annotations can be used to teach students, such as by providing annotations with definitions or annotations that are examination questions.

In certain embodiments, the user can generate an annotation by selecting (e.g., via a mouse click) a surface of any portion of the 3D object 402. At the point of selection, a visible marker can be displayed on the model, and a textual annotation or other form of content (e.g., image, hyperlink, video) can be associated with the marker. As the user navigates around the 3D object 402, the annotation is shown floating near the marker with its position continuously updated with any moving of the marker. The annotation can be shown or hidden depending on the presence of other content or the visibility or opacity of the portion or layer of the 3D object 402 with which the annotation is associated. Markers and their associated annotations can additionally be highlighted as part of a textual search on the model.

Associated Articles and Community Editable Content

The user's current view may include content associated with the view. The content can include, for example, reference articles and community generated and/or editable content. The content can be, for example, content associated with a query from the user related to the user's current view. The content can also be, for example, content associated with the portions of the 3D object 402 displayed in the user's current view. In FIG. 4D, a view of the human liver 422, the example illustration also includes an optional display of related content 424 that includes an article on the liver from Wikipedia and a definition of the term "liver." The user can further generate or edit content to be displayed in the related content 424 section, such as an article related to the liver.

Bookmark Tours

Bookmarks (e.g. URLs 412*a*, 412*b*, and 412*c*) can be shared amongst users to create a video or "tour." Specifically, several bookmarks can be loaded in sequence to display several views of the 3D object 402 in sequence. For example, a first URL for a view of the human lips can be loaded, followed by the loading of a second URL for a view of the inside of the mouth, followed by the loading of a third URL for a view of the inside of the throat. These three URLs, when loaded together, give the appearance of a tour of traveling through the beginning of the digestive system, from outside the mouth to into the throat, due to the user's view of the 3D object 402 transcending between the three views, for example, using animation. A user can view multiple bookmarks representing a tour, for example, by receiving a single address associated with the multiple bookmarks, and loading the single address in the 3D enhanced web browser 124 by clicking on the single address. The multiple bookmarks are then loaded by the 3D enhanced web browser 124 in response to the loading of the single address, for example, due to the single address being a shortened URL associated with the multiple bookmarks.

Accordingly, the processor 112 of the client 110 is configured to execute instructions from the local copy of the object browser web page 126 causing the processor 112 to receive, by a user, a first address associated with a first view of the 3D object 402 and a second address associated with a second view of the 3D object 402. The processor 112 is also configured to sequentially display the first view of the 3D object 402 in the 3D enhanced web browser 124 on the output device 114 based on the first address and the second view of the 3D object 402 in the web browser 124 based on the second address. The current view of the user transcends from the first view of the 3D object 402 in the web browser 124 to the second view of the 3D object 402 in the web browser 124 as described above.

The first address and the second address can be associated with Uniform Resource Locator (URL) links received from a second user (e.g., they can be pointers), or the first address and the second address can be URLs themselves. The display of the first view and the second view in the web browser 124 can be in response to the user activating the URL links for the first address and the second address. The transition of the current view of the user transcending from the first view of the 3D object 402 to the second view of the 3D object can be animated.

Additionally, a single address can be provided that is associated with the first address and the second address, such that, when the single address is loaded in the web browser 124, the first address and the second address are received or otherwise loaded by the web browser 124. When each of the single address, the first address, and the second address are URLs, the first address and the second address can be associated with the single address using a URL shortener.

Group Labeling [0061] Labels can further be combined into groups and displayed accordingly. For example, with reference to the exemplary screenshot 496 of FIG. 4E, wherein the 3D object 402 is a human body and the current view is a view of the human brain, a group label 497 "brain" is displayed. When the user selects the "+" indicator 498 in the group label 497 (e.g., by clicking on it with a mouse), the group label 497 is expanded or "exploded" causing all child labels of the group label 497 to be displayed, as illustrated in the exemplary screenshot 499 of FIG. 4F By grouping labels, a user, for example, is not overwhelmed with labels and the 3D object 402 is not obscured with too many labels in a current view. Users have the option of selectively viewing more child labels when desired.

Integration of Images and Animations and Editable Entries

Figure 4G:
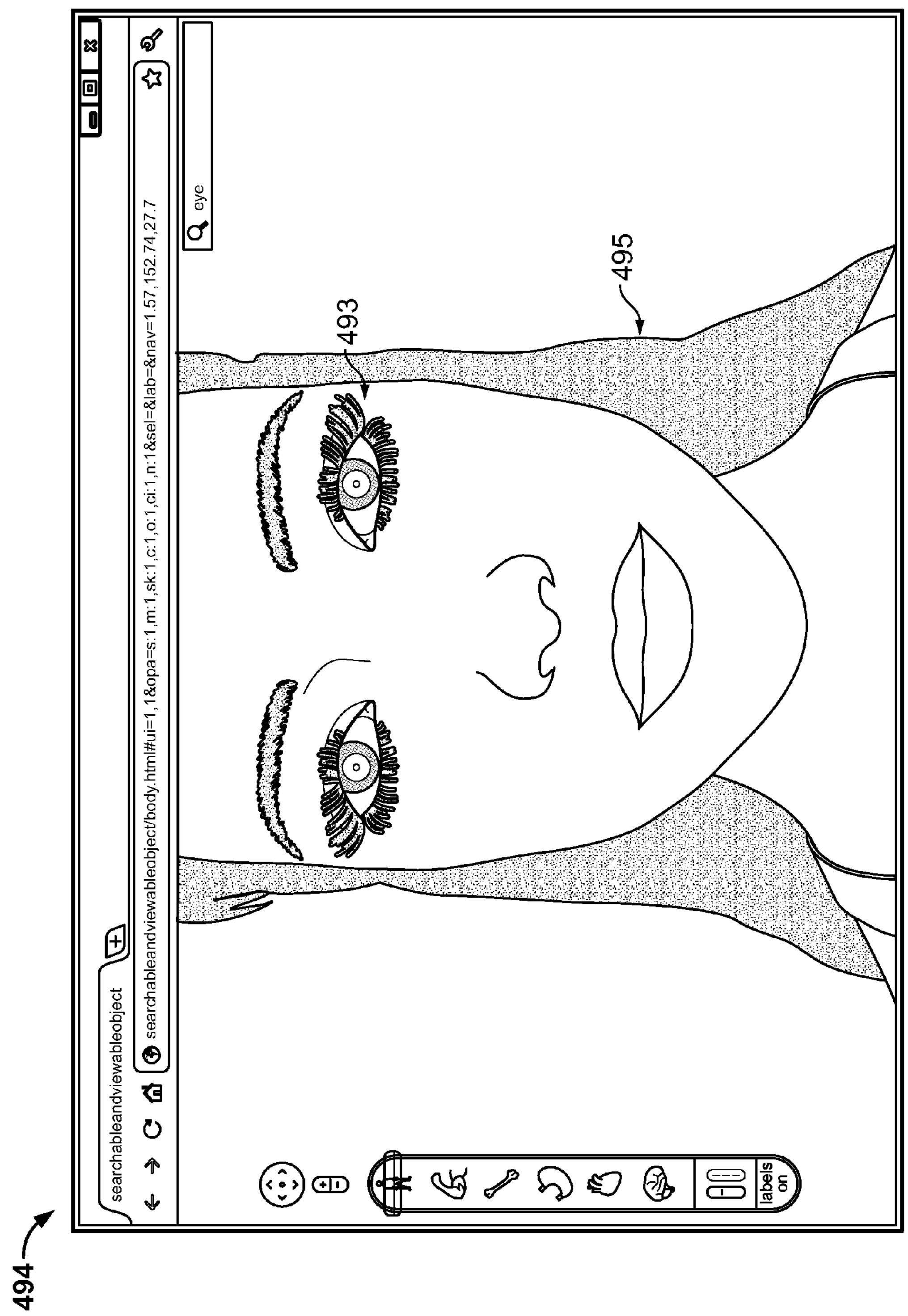

FIG. 4G is an exemplary screenshot 488 of the 3D enhanced web browser 124 from the viewing angle of FIG. 4C after the user has provided user generated content, namely, a cirrhotic liver 487. The user can use a 3D content generation tool such as AutoCAD to generate a portion of the 3D object 402 for display in the 3D enhanced web browser 124. In certain aspects, an online application can be provided as a 3D content generation tool that allows authoring of 3D content directly in the 3D enhanced web browser 124 using authoring aids such as still images, 3D images (e.g., 3D radiological images for a human body), diagrams, 3D reference volumes, and other 3D content authored by other user. Such generated 3D content can be associated with portions of a 3D object as described below, allowing the generated 3D content to be displayed with the 3D object as a preview for authoring purposes and/or during viewing by users.

The generated portion of the 3D object 402 can be based on, for example, a corresponding reference portion (e.g., a reference liver) provided to the user from the 3D object 402. In the illustrated example, the user generated a 3D human liver suffering from cirrhosis and integrated the 3D cirrhotic liver 487 into the 3D human body using tools provided by the interface but not displayed. The user has generated the annotation "my cirrhotic liver" 489 to label the 3D cirrhotic liver 487. The 3D generated content can be shared amongst users such that a library of editable entries (e.g., anatomic entries) can be made available to users for editing and placement in the 3D object 402. For example, generated 3D content can be uploaded to a shared location and tagged for later indexing and retrieval. As another example, the user can change the coloring of the 3D human body to reflect dermatomes such that different areas of the skin related to different spinal nerves have different colors, or to reflect meridians of acupuncture.

The user can also generate a 3D animation for integration and playback on the 3D object 402 using 3D animation generation tools, including tools provided by the interface but not displayed. For example, the user can generate a 3D animation of chemical digestion taking place in the small intestine using 3D animation generation tools for integration and playback on the 3D object 402. The user-generated 3D animation can be uploaded to and stored in the user generated content 142 database in the memory 132 of the server 130 for accessibility and viewing by other users. Viewing by other users of the user-generated 3D animation can be shared using the bookmark system described above.

The editing of the 3D object 402 within the disclosed system is not limited to integrating 3D portions of the object using 3D content and/or animation generation tools. Users can, for example, provide their own images (e.g., medical images such as a magnetic resonance image or an X-ray) for processing by the disclosed system and integration into the 3D object 402 for display. The privacy of such medical images can be designated by the user, such as by limiting the images to local storage on the client 110 and/or being made inaccessible to any one other than the user. In certain aspects, anonymous medical images whose subject cannot be identified can be tagged or otherwise categorized by the disclosed system and made available to the user when the user's query relates to a portion of the body associated with the medical image. For example, when a user enters the query "knee," anonymous X-rays of various knee injuries can be linked to by the disclosed system for the user to see as an X-ray image, or even integrated onto the 3D object 402.

Users can also provide additional 3D objects for display near, at, or within the 3D object 402. For example, a physician seeking to educate a patient on a surgical procedure involving a knee injection can use the disclosed system to integrate a 3D needle at an injection position with respect to a knee on a 3D human body. The physician can then send the bookmark for that view to the patient so that the patient can explore, in 3D, the injection procedure on the 3D human body that includes the displayed 3D needle.

The 3D object 402 can yet further be modified based on analytics. For example, for analytics based on web site traffic of certain views of the 3D human body, the 3D human body can be rendered as a homunculus with body portion size based on the popularity of views of that body portion.

Markup Language

Customizations to the 3D object 402, including still images, video, static 3D objects, animated 3D objects, and voxel fields (with or without position-specific metadata), and content as described above can be integrated into the 3D object 402 using a markup language. For a human body, it could be considered a body markup language (BML). In certain aspects, the markup language is an XML schema for expressing physical annotation and visualization within the 3D object 402. A markup language file can be provided with the 3D object 402 to specify a set of features (place marks, images, polygons, 3D models, textual descriptions, etc.) for display in or on the 3D object 402 of the disclosed system. The file can be compatible with other systems that implement markup language encoding.

Content can be integrated into the 3D object 402 by referring to the 3D object 402 as a whole, by naming specific portions of the 3D object 402, or by identifying specific points on, around, or within the 3D space of the 3D object 402. The content can be located in respect to (or "registered against") one or more portions of multiple 3D objects 402 by automated scaling and orientation to match portions of each 3D object 402, by text or image matching to labeled portions of each 3D object 402, by surface coordinates of each 3D object 402, and by 3D object specifications ("reference volumes") for each 3D object 402 that are provided for authoring purposes. A reference volume can be either a detailed 3D shape, a 3D shape that has been significantly lowered in resolution while still retaining key shape characteristics, a set of attachment points to other known entities, or any combination thereof. Similar content (e.g., a mammalian liver) can be matched to multiple 3D objects 402 (e.g., different 3D objects 402 representing mammals) by means of identifying/tagging commonalities between the 3D objects 402 (e.g., identifying the location of the liver in each mammal) using the registration methods described above.

For example, the user who generated the cirrhotic liver 487 can request the disclosed system to place the liver as a replacement at the BML coordinates (329, 112, 983), which define the position for integrating the replacement human liver in the 3D human body according to BML. Any other user seeking to appropriately replace the displayed liver in the 3D human body would use the same coordinates. As another example, the user who generated the cirrhotic liver 487 can request the disclosed system to place the liver as a replacement on a reference body, such as by making the cirrhotic liver 487 equivalent to or otherwise associated with the liver from the reference body in some or all dimensions.

Reconstruction of Related or Reduced Content and Physics-Based Animation

In certain aspects, the processor 112 of the client 112 is instructed to download, from the searchable data of the 3D object 140 on the server, partial data for portions of the 3D object 402 that are related to other portions of the 3D object 402. The processor 112 can then generate and display the remaining portions of the 3D object 402 based on the data for the portion that is downloaded.

For instance, the processor 112 can identify portions of a 3D object 402 that are repeated with the same or similar shape (e.g., a trivially modified shape such as a minor inversion) in the rest of the 3D object 402. The processor 112 of the client 112 then downloads, from the searchable data of the 3D object 140 on the server, one copy of the identified portion (e.g., the geometry of the identified portion). Textures and/or other features common to multiple symmetrical portions can be isolated, and transformations to map those textures to similar portions can also be isolated and sent to the processor 112 of the client 110 to be reconstructed. The processor 112 then generates and displays other instances of that downloaded portion via translations, rotations, and/or other trivial deformations of that portion of the 3D object 140. The amount of data downloaded from the server 130 is reduced, as is the amount of space required in the memory 120 of the client 110.

Figures 4H, 4I:
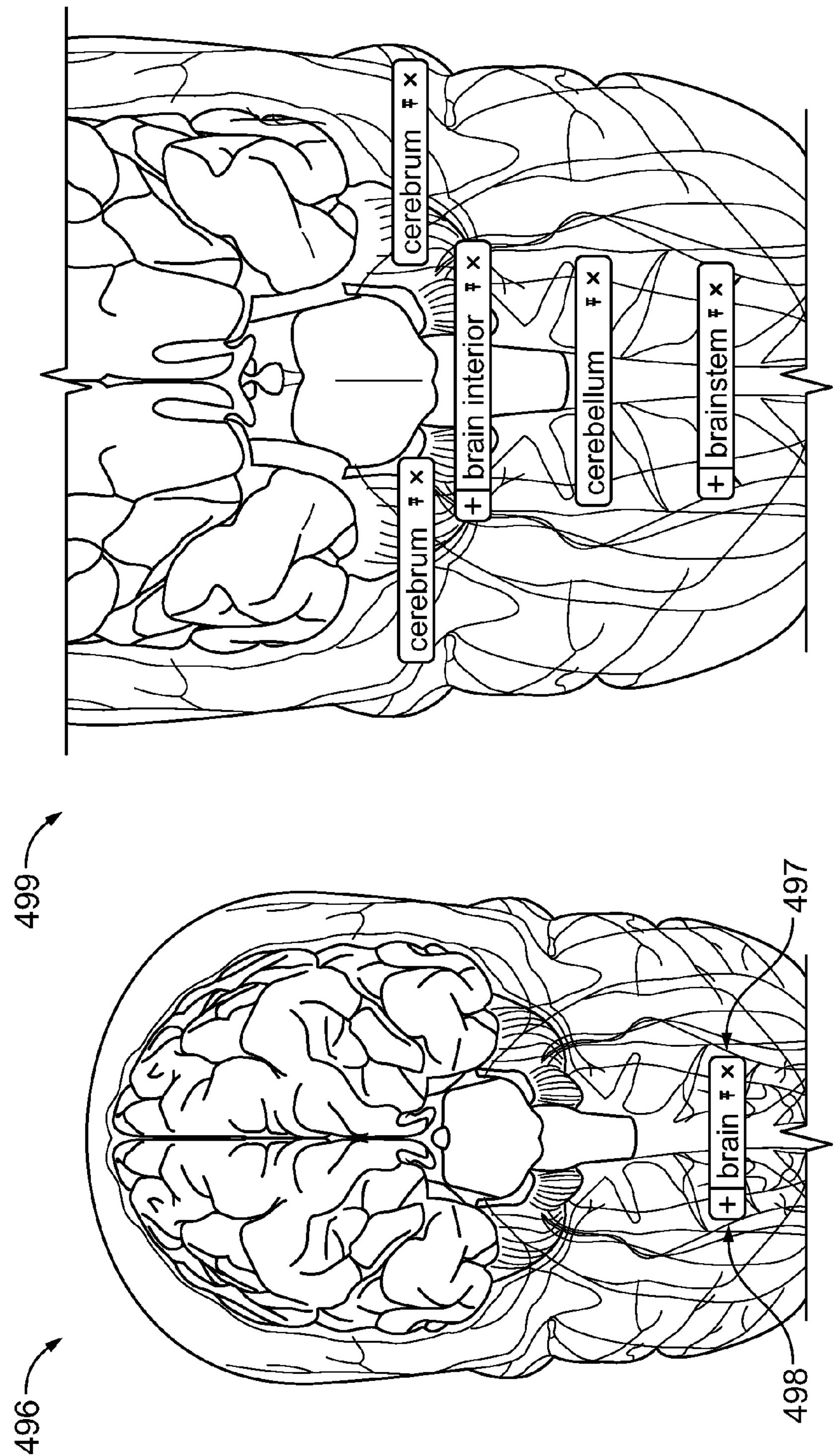

FIG. 4H is an exemplary screenshot 490 of the face of a 3D human body. As with much of the 3D human body, the face includes many portions that are symmetric. For example, in FIG. 4H, the right side 492 of the face of the 3D human body is symmetric to the left side 491 of the face, with the exception of the hair. The processor 112 can download the searchable data of the 3D object 140 for one side 491 or 492 of the face and generate, for display, the remaining side of the face 492 or 491 based on the searchable data 140 downloaded.

Similarly, in certain aspects, the processor 112 of the client 112 is instructed to download, from the searchable data of the 3D object 140 on the server, a reduced amount of the searchable data of the 3D object 140. The processor 112 can then generate and display the remaining portions of the 3D object 402 based on the reduced amount of data that is downloaded. For instance, searchable data of the 3D object 140 that includes a polygonal mesh model with a significant number of shapes can be compactly represented (e.g., a rectangular prism can be represented via two 3D vertices, and a cylinder can be represented via two endpoints and an arbitrary series of radii). The searchable data of the 3D object 140 can be reduced in size based on such compact representation by configuring the processor 136 of the server 130 to detect the presence of reducible shapes and constructs compact representations of them. The processor 112 of the client 110 can then generate and display the 3D object 402 based on the reduced size searchable data of the 3D object 140 that is downloaded.

Furthermore, the processor 112 of the client 112 is configured, based on instructions from the local copy of the object browser web page 126, to display interactive (e.g., real-time) physics-based animation on the 3D object 402. For example, in the exemplary screenshot 490, the eyes 493 of the 3D human body can be made to blink, such as by articulating the eyes 493 with an appropriate physics engine. Exemplary physics engines include, but are not limited to, Box2DJS and Exocortex Momentum 2.0. As another example not illustrated, in a view of the muscular system, if the hand of the 3D human body is displayed as closing, the appropriate muscle fibers responsible for closing the hand can be animated (e.g., based on inverse kinematics) to reflect the muscular movement necessary to close the hand. The physics-based animation on the 3D object 402 can apply to a customized 3D object 402, as discussed below.

Customization of Look

In certain aspects, the disclosed system is configured to receive input from the user to customize the appearance of the 3D object 402. For example, the user can provide certain parameters to customize the appearance of a 3D human body. Parameters can be provided for the color, size, and shape of any portion of the 3D object 402. Exemplary parameters for a 3D human body include gender, height, age, ethnic origin, girth, body fat, muscularity, hair color, hair length, eye color, skin color, nose shape, chin shape, eye shape, ear shape, lip shape, lip color, hand size, foot size, and measurements such as blood sugar or low-density lipoprotein (LDL) cholesterol. For example, a large value provided by a user for the height parameter will be reflected in making the 3D human body appear taller, while a small value provided by a user for the height parameter will be reflected in making the 3D human body appear shorter. Similarly, a parameter designating the male gender and a large value provided for the age parameter will be reflected in making the 3D human body appear as an old male with appropriate visual features (e.g., gray hair, wrinkled skin), while a small value provided by a user for the age parameter will be reflected in making the 3D human body appear as a younger male with appropriate visual features (e.g., shorter height, a reduced or lack of secondary sexual characteristics). As yet another example, a default view of the 3D object 402 representing the human body may have a small amount of cholesterol-related plaque build up in the walls of certain blood vessels. Providing a parameter indicating a higher level of LDL cholesterol will increase the size of the plaques. Parameters can interact such that plaque depends, for example, on LDL cholesterol, age, and presence of a cholesterol-lowering medication. The representation of changes to the 3D object 402 can be automated using a scripting mechanism.

In certain embodiments, these parameters can be adjusted by a user using an adjustment interface similar to the slider 410 described above. For example, a user can adjust a movable indicator of a different slider from one direction to another in order to make the 3D human body appear older.

As a further example, FIG. 4I is an exemplary screenshot 494 of the 3D enhanced web browser 124 from the viewing angle of FIG. 4H with personalization reflecting the user's appearance. Specifically, the user has selected to change the color of the eyes 493 to blue and the color of the hair 495 to blond, as well as increase the length of the hair 495.

In certain aspects, the user can customize the appearance of the 3D object 402 using image data. In addition to the description above related to medical images, the user can provide photographs that the disclosed system can use to process and modify the appearance of the 3D object 402. For example, the user can provide a self portrait. The disclosed system can then, apply appropriate image analysis software to the self portrait, modify the gender, height, age, girth, body fat, muscularity, hair color, hair length, eye color, skin color, nose shape, chin shape, eye shape, ear shape, lip shape, lip color, hand size, and foot size to have a 3D human body 402 resemble the user. The customization based on a self portrait or other user data can be deleted at any time, users can at any time designate the data they provide as anonymous, and any data provided by a user can be deleted at any time.

Internet Search Results

The searchable data 140 of the 3D object 140 that includes identifiers of portions of the 3D object 402 is searchable using other search systems, such as a general Internet content web search system. A user that enters a search query for an identifiable portion of the 3D object 402 into an Internet search engine that is coupled to the searchable data of the 3D object 140 can be presented with the portion of the 3D object 402 as a search result. This can be achieved, for example, by means of indexing and matching related terms or topics. The searchable data 140 can be constructed from an existing database, or can be constructed gathering together disparate information on a 3D object 402. For example, the searchable data 140 can be constructed by crawling the World Wide Web to identify searchable data 140 files associated 3D objects 402 with recognized file extensions and file formats, and by examining in-page metadata accompanying links to searchable data for 3D objects 140. The results of the search query can be displayed either directly as primary or "first-order" results retrieved from a search index, or indirectly (e.g., as a suggestion) alongside first-order results. The results may be presented either using 2D previewing as described above, using a low resolution model of the 3D object 402, or using a high resolution model of the 3D object 402. In cases where a portion of the 3D object 402 is determined to be the likely result of the search query (a "3D search result"), the portion of the 3D object 402 can be displayed in viewable and searchable form as the primary search result, and the non-3D search results can be displayed in a secondary visual presentation.

For example, a user that enters the search query "liver" into an Internet search engine that is coupled to the searchable data of the 3D object 140, can be presented with a viewable and searchable form of the 3D human body as a primary search result on the search results screen, with the liver made opaque and the rest of the 3D human body made transparent. Additional search results, such as a link to an encyclopedia entry on the liver, can be displayed elsewhere on the search results screen.

Server-Side and Client-Side Scripting

The 3D object 140 is configured to be controlled by scripts that run within either a server-side runtime environment on the server 130 or a client-side runtime environment on the client 110.

With server-side scripting, a user can enter instructions (e.g., via a scripting language such as JavaScript), into an interface provided within the 3D object user interface. The instructions, which when executed on the server 130, can be streamed to the 3D enhanced web browser 124 as commands to modify aspects of the 3D object 402, such as navigation or annotation, or construct additional user interface elements or applications that run alongside of the 3D object 402. For example, the commands can rotate the 3D object 402, select portions of the 3D object 402, generate quizzes related to the 3D object 402, and transition between views of the 3D object 402.

With client-side scripting, the user can display the 3D object 402 on any web page (e.g., a personal web page of the user) using, for example, a cohesive package of code (e.g., from the searchable data of the 3D object 140) and HTML/CSS formatting data. The package of code can be embedded directly within a web page, and run as instructions (e.g., via a scripting language such as JavaScript) within the web page. The web page can interact with the 3D object 402 via well-established interfaces in order to, for example, control aspects of the 3D object 402 that are normally controllable via the user interface (e.g., via user input, such as the mouse or keyboard), customize the 3D object 402 by programmatically adding or modifying content, and query the 3D object 402 for information (e.g., a list of portions associated with the 3D object 402).

Multiscreen Display of the 3D Object

The 3D enhanced web browser 124 is configured to display the 3D object 140 on a multiscreen display. For example, the 3D object 140 can be displayed in an immersive display arrangement, wherein the user is surrounded by a semicircle of screens displaying the 3D object 140.

Exemplary Computer System for the Server and/or Client

Figure 5:
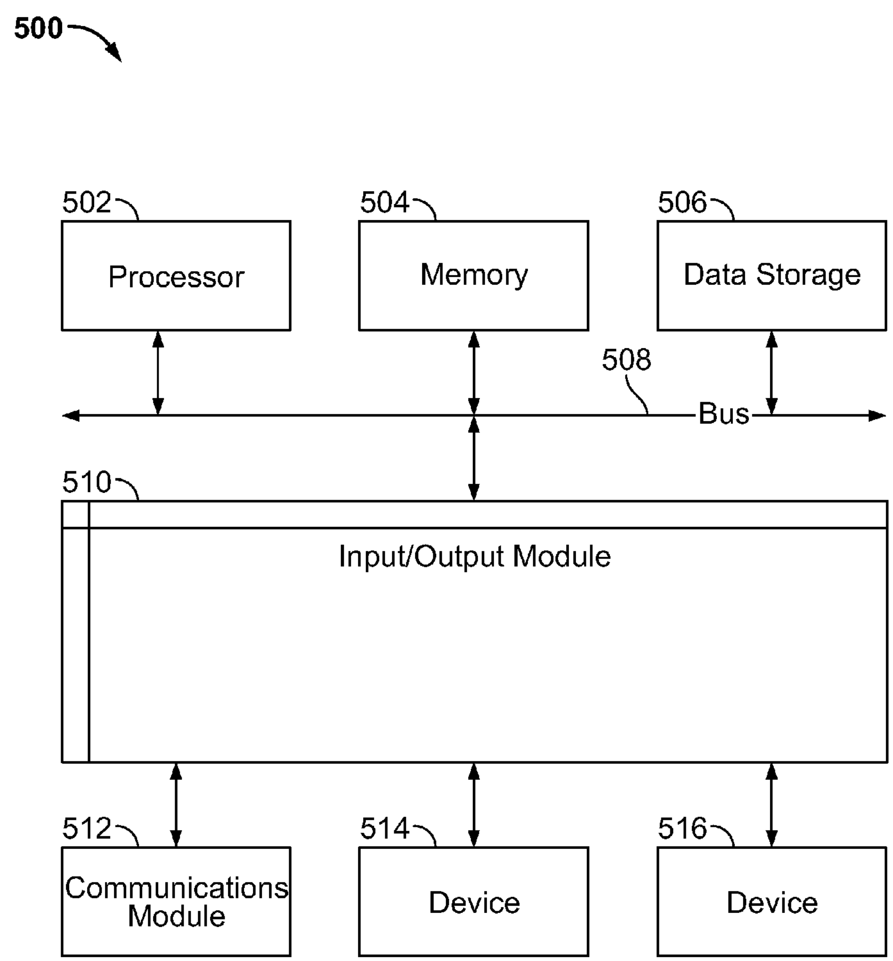
FIG. 5 is a block diagram illustrating an exemplary computer system with which the clients and servers of FIG. 1 can be implemented.

FIG. 5 is a block diagram illustrating an exemplary computer system with which the clients 110 and servers 130 of FIG. 1 can be implemented. In certain aspects, the computer system 500 may be implemented using hardware or a combination of software and hardware, either in a dedicated server, or integrated into another entity, or distributed across multiple entities.

Computer system 500 (e.g., clients 110 and servers 130) includes a bus 508 or other communication mechanism for communicating information, and a processor 502 (e.g., processor 112 and 136) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 120 and 132), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512 (e.g., communications module 118 and 138). Exemplary communications modules 512 include networking interface cards, such as Ethernet cards and modems. In certain aspects, the input/output module 510 is configured to connect to a plurality of devices, such as an input device 514 (e.g., input device 116) and/or an output device 516 (e.g., output device 114). Exemplary input devices 514 include a keyboard and a pointing device, e.g., a mouse or a trackball, by which a user can provide input to the computer system 500. Other kinds of input devices 514 can be used to provide for interaction with a user as well. For example, feedback provided to the user can be any form of sensory feedback, e.g., visual feedback, auditory feedback, or tactile feedback; and input from the user can be received in any form, including acoustic, speech, or tactile input. Exemplary output devices 516 include display devices, such as a CRT (cathode ray tube) or LCD (liquid crystal display) monitor, for displaying information to the user.

According to one aspect of the present disclosure, the client 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network and a wide area network.

Computing system 500 can include clients and servers. A client and server are generally remote from each other and typically interact through a communication network. The relationship of client and server arises by virtue of computer programs running on the respective computers and having a client-server relationship to each other. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

Systems, methods, and machine-readable media for using a 3D-enhanced web browser to view and search a 3D object, such as the human body, have been described. In certain aspects, using the 3D enhanced web browser, a user can view, search, and transcend layers of the 3D human body. The user can further customize the appearance of the 3D human body and share view of the 3D human body using many of the tools and features disclosed.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features can in some cases be excised from the combination, and the combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

What is claimed is:

1. A computer-implemented method for viewing a three-dimensional (3D) object using a web browser having integrated 3D modeling capabilities, the method comprising:

obtaining, by a processor, data of a 3D object from a web browser having integrated 3D modeling capabilities when the web browser is installed;

displaying, by a processor, at least a portion of the 3D object in the web browser based on an initial default view, or a user selected view based on a query received from a user, wherein the 3D object comprises an outer surface and at least one internal structure beneath the outer surface, and wherein the user selected view comprises an opacity of the outer surface and the internal structure;

receiving a search query of the 3D object from the user;

generating, for display, a portion of the 3D object responsive to the search query in response to the search query;

receiving, a first address associated with the initial default view or the user selected view of the 3D object and a second address associated with a second view of the 3D object; and displaying sequentially the initial default view or the user selected view of the 3D object in the web browser based on the first address and the second view of the 3D object in the web browser based on the second address, wherein a current view of the 3D object transcends from the initial default view or the user selected view of the 3D object in the web browser to the second view of the 3D object in the web browser.

2. The computer-implemented method of claim 1, wherein the current view comprises at least one of a rotation of the at least a portion of the 3D object, the opacity of the outer surface and the internal structure, a level of zoom of the at least a portion of the 3D object, and a determination of whether at least one of the outer surface and the internal structure are selected.

3. The computer-implemented method of claim 1, wherein when a current view is at a first point above the outer surface and the user selects to view the at least one internal structure from a second point beneath the outer surface, the current view transcends from the first point through the outer surface to the second point within the current view.

4. The computer-implemented method of claim 1, the method further comprising:

retrieving from storage and displaying at least one identification label for each of a plurality of items within the current view;

determining at least one identification label to displayed based on at least one of a visibility of each of the plurality of items within the current view, the size of each of the plurality of items within the current view, the opacity of each of the plurality of items within the current view, the proximity of each of the plurality of items within the current view to the position of the current view, and the order of each of the plurality of items according to the 3D object; and displaying the determined at least one identification label.

5. The computer-implemented method of claim 1, wherein the first address and the second address are associated with Uniform Resource Locator (URL) links received from a second user, and wherein the display of the first view and the second view in the web browser are in response to activation of the URL links for the first address and the second address.

6. The computer-implemented method of claim 1, wherein each of the first address and the second address comprise a parameter defining, in a current view of the 3D object, an amount of time to display the current view.

7. The computer-implemented method of claim 1, further comprising:

receiving a single address associated with the first address and the second address; and loading the single address in the web browser, wherein the receiving the first address and the second address is in response to loading the single address in the web browser.

8. The computer-implemented method of claim 1, wherein the portion of the 3D object responsive to the alphanumeric input is generated for display prior to the alphanumeric input being completed and submitted by the user for processing.

9. The computer-implemented method of claim 1, further comprising:

providing at least one computer-generated search term, from a predetermined list of stored search terms associated with the searchable data, for display in response to alphanumeric input from the user, the at least one computer-generated search term being responsive to the alphanumeric input; and concurrently generating for display a portion of the 3D object associated with the selected computer-generated search term when the at least one computer-generated search term is generated for display.

10. A system for viewing a three-dimensional (3D) object using a web browser having integrated 3D modeling capabilities, the system comprising:

a memory for storing data of a 3D object obtained via a web browser having integrated 3D modeling capabilities when the web browser is installed; and a processor configured to:

receive a request to display, in the web browser, the 3D object based on an initial default view, or a user selected view based on a query received from a user;

display, in the web browser, at least a portion of the 3D object based on the initial default view, or the user selected view based on the query received from a user, wherein the 3D object comprises an outer surface and at least one internal structure beneath the outer surface, and wherein the user selected view comprises an opacity of the outer surface and the internal structure;

receive a search query of the 3D object from the user web browser; and provide, in response to the request, for display a portion of the 3D object responsive to the search query in response to the search query;

receive a first address associated with the initial default view or the user selected view of the 3D object and a second address associated with a second view of the 3D object; and display sequentially the initial default view or the user selected view of the 3D object in the web browser based on the first address and the second view of the 3D object in the web browser based on the second address, wherein a current view of a 3D object transcends from the first view of the 3D object in the web browser to the second view of the 3D object in the web browser.

11. The system of claim 10, wherein the user selected view comprises at least one of a rotation of the at least a portion of the 3D object, the opacity of the outer surface and the internal structure, a level of zoom of the at least a portion of the 3D object, and a determination of whether at least one of the outer surface and the internal structure are selected.

12. The system of claim 10, wherein when a current view is at a first point above the outer surface and the user selects to view the at least one internal structure from a second point beneath the outer surface, the processor is configured to transcend the current view from the first point through the outer surface to the second point within the current view.

13. The system of claim 10, wherein the first address and the second address are associated with Uniform Resource Locator (URL) links received from a second user, and wherein the display of the first view and the second view in the web browser are in response to activation of the URL links for the first address and the second address.

14. The system of claim 10, wherein each of the first address and the second address comprise a parameter defining, in a current view of the 3D object, an amount of time to display the current view.

15. The system of claim 10, wherein the processor is further configured to:

receive a single address associated with the first address and the second address; and load the single address in the web browser, wherein the processor is configured to receive the first address and the second address is in response to loading the single address in the web browser.

16. A non-transitory machine-readable storage medium comprising machine-readable instructions for causing a processor to execute a method for viewing a three-dimensional (3D) object using a web browser having integrated 3D modeling capabilities, the method comprising:

obtaining data of a 3D object comprising an outer surface and at least one internal structure beneath the outer surface via a web browser having integrated 3D modeling capabilities when the web browser is installed;

displaying, in the web browser, at least a portion of the 3D object based on an initial default view, or a user selected view based on a query received from a user, wherein the user selected view comprises an opacity of the outer surface and the internal structure;

receiving a search query of the 3D object from the user, generating, for display, a portion of the 3D object responsive to the search query in response to the search query;

receiving, a first address associated with the initial default view or the user selected view of the 3D object and a second address associated with a second view of the 3D object; and displaying sequentially the initial default view or the user selected view of the 3D object in the web browser based on the first address and the second view of the 3D object in the web browser based on the second address, wherein a current view of the 3D object transcends from the initial default view or the user selected view of the 3D object in the web browser to the second view of the 3D object in the web browser.

17. The non-transitory machine-readable storage medium of claim 16, wherein the user selected view further comprises at least one of a rotation of the at least a portion of the 3D object, a level of zoom of the at least a portion of the 3D object, and a determination of whether at least one of the outer surface and the internal structure are selected.

* * * * *